(12) United States Patent  
Tsukioka

(10) Patent No.: US 7,373,020 B2  
(45) Date of Patent: May 13, 2008

(54) IMAGE PROCESSING APPARATUS AND IMAGE PROCESSING PROGRAM

(75) Inventor: Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 762 days.

(21) Appl. No.: 10/861,761

(22) Filed: Jun. 3, 2004

(65) Prior Publication Data

US 2005/0041116 A1 Feb. 24, 2005

(30) Foreign Application Priority Data

| Jun. 5, 2003 | (JP) | ............................. 2003-161185 |
| May 25, 2004 | (JP) | ............................. 2004-155244 |
| May 28, 2004 | (JP) | ............................. 2004-158924 |

(51) Int. Cl.
  *G06K 9/32* (2006.01)
  *G06K 9/40* (2006.01)
  *G06K 9/00* (2006.01)

(52) U.S. Cl. ...................... 382/300; 382/274
(58) Field of Classification Search ................ 382/300, 382/299, 254, 274, 162, 167; 348/222.1, 348/223.1, 272; 358/448, 461
See application file for complete search history.

(56) References Cited

U.S. PATENT DOCUMENTS

| 4,716,455 A | 12/1987 | Ozawa et al. |
| 5,629,734 A | 5/1997 | Hamilton, Jr. et al. |
| 6,906,753 B1* | 6/2005 | Matoba et al. ............... 348/362 |
| 7,176,966 B2* | 2/2007 | Inoue et al. ............. 348/222.1 |
| 2001/0033701 A1 | 10/2001 | Okisu et al. |
| 2002/0044778 A1 | 4/2002 | Suzuki |
| 2003/0098917 A1* | 5/2003 | Oda ........................... 348/272 |
| 2004/0041919 A1* | 3/2004 | Yamanaka ............... 348/222.1 |

FOREIGN PATENT DOCUMENTS

| EP | 0 199 129 A2 | 10/1986 |
| EP | 0 732 859 A2 | 9/1996 |
| EP | 1 187 455 A2 | 3/2002 |
| JP | 61-218290 A | 9/1986 |
| JP | 08-298668 A | 11/1996 |
| JP | 11-055558 A | 2/1999 |
| JP | 11-055682 A | 2/1999 |
| JP | 11-122525 A | 4/1999 |
| JP | 11-215512 A | 8/1999 |
| JP | 2000-324505 A | 11/2000 |
| JP | 2000-341700 A | 12/2000 |
| JP | 2001-036917 A | 2/2001 |
| JP | 2002-084547 A | 3/2002 |

\* cited by examiner

*Primary Examiner*—Yon J. Couso
(74) *Attorney, Agent, or Firm*—Frishauf, Holtz, Goodman & Chick, P.C.

(57) ABSTRACT

The present invention is an image processing apparatus applied to a digital camera which includes a Bayer array CCD for producing and outputting an image lacking at least one type of color component per pixel by capturing an optical image focused by an optical system, a line correction circuit for correcting the difference in gain between lines on the image output from the CCD via a single-chip image buffer, and an interpolation circuit for producing color image data by interpolating a missing color component at each pixel of the single-chip image data output from the line correction circuit via a WB correction circuit based on information regarding neighborhood pixels.

27 Claims, 26 Drawing Sheets

FIG. 4

| R | G1 | R | G1 | R |
|---|----|---|----|---|
| G2 | B | G2 | B | G2 |
| R | G1 | R | G1 | R |
| G2 | B | G2 | B | G2 |
| R | G1 | R | G1 | R |

FIG. 6
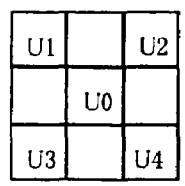
FIG. 7A  FIG. 7B  FIG. 7C  FIG. 7D
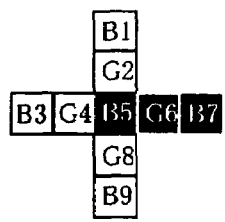 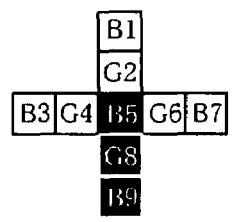 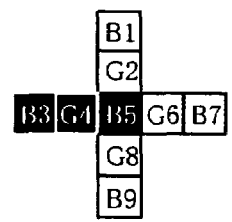 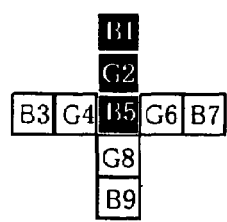

FIG. 9A

| G1 | R | G1 | R | G1 |
|----|---|----|----|----|
| B | G2 | B | G2 | B |
| G1 | R | G1 | R | G1 |
| B | G2 | B | G2 | B |
| G1 | R | G1 | R | G1 |

FIG. 9B

| | P1:<br>R1/G1 | | P2:<br>R2/G2 | |
|---|---|---|---|---|
| | | | | |
| | P3:<br>R3/G3 | G0 | P4:<br>R4/G4 | |
| | | | | |
| | P5:<br>R5/G5 | | P6:<br>R6/G6 | |

FIG. 14

| P1 | P2 | P3 |
|----|----|----|
| P4 | P0 | P5 |
| P6 | P7 | P8 |

FIG.19A  FIG.19B

|   | 1 | R | Gr | R | Gr | R | Gr |
|---|---|---|----|---|----|---|----|
|   | 2 | Gb | B | Gb | B | Gb | B |
|   | 3 | R | Gr | R | Gr | R | Gr |
| LINE NO. | 4 | Gb | B | Gb | B | Gb | B |
|   | 5 | R | Gr | R | Gr | R | Gr |
|   | 6 | Gb | B | Gb | B | Gb | B |

| R=128 | Gr=180 |
|-------|--------|
| Gb=100 | B=128 |

| G0 | R  | G1 |
|----|----|----|
| B  | G4 | B  |
| G2 | R  | G3 |

FIG.24

| G0 | R | G1 |
|----|---|----|
| B | G4 | B |
| G2 | R | G3 |

$$A0 = \frac{(G0+G1)}{2}$$

$$A1 = \frac{(G0+G2)}{2}$$

$$A2 = \frac{(G1+G3)}{2}$$

$$A3 = \frac{(G2+G3)}{2}$$

$$A4 = \frac{(G1+G2)}{2}$$

$$A5 = \frac{(G0+G3)}{2}$$

IMAGE PROCESSING APPARATUS AND IMAGE PROCESSING PROGRAM

This application claims benefit of Japanese Application No. 2003-161185 filed in Japan on Jun. 5, 2003, Japanese Application No. 2004-155244 filed in Japan on May 25, 2004, Japanese Application No. 2004-158924 filed in Japan on May 28, 2004, the contents of which are incorporated by this reference.

BACKGROUND OF THE INVENTION

1. Field of the Invention

The present invention relates to image processing apparatuses and image processing programs for processing images output from a single-chip image pickup system, a two-chip image pickup system, or a three-chip pixel-shifting image pickup system to generate a color digital image with three color component values at each pixel.

2. Description of the Related Art

Single-chip image pickup systems frequently used in, for example, digital cameras use a single-chip image pickup element having a different color filter for each pixel, and an image output from the image pickup element has only one type of color component value at each pixel. Thus, interpolation for compensating for missing color component values at each pixel is required to produce a color digital image. Interpolation for compensating for these missing color component values is also required in apparatuses which use a two-chip image pickup system or a three-chip pixel-shifting image pickup system.

This interpolation may cause the finally produced color images to undergo deterioration such as false color or blurring, unless ingenuity is exercised. For this reason, interpolation based on various methods has been proposed. Interpolation is classified roughly into two types. One is based on a method of edge detection and the other is based on a method of color correlation.

A technique based on edge detection is described in, for example, Japanese Unexamined Patent Application Publication No. 8-298669. The technique described in that Patent Application Publication will now be described with reference to FIGS. 32A and 32B. FIGS. 32A and 32B are illustrations for known interpolation based on edge detection.

It is assumed that a single-chip image pickup element is realized by, for example, a single-chip Bayer array image pickup element provided with color filters of a three-primary-color Bayer array, as shown in FIG. 32A. When neighborhood pixels of B5 in the form of a cross, which is a pixel of interest, are given, as shown in FIG. 32B, along the vertical direction and the horizontal direction, an interpolation value Gh for G in the horizontal direction and an interpolation value Gv for G in the vertical direction of the relevant pixel of interest are estimated as shown in Expression 1.

$$Gh=(G4+G6)/2+(2\times B5-B3-B7)/4 \qquad \text{[Expression 1]}$$

$$Gv=(G2+G8)/2+(2\times B5-B1-B9)/4$$

Then, evaluation values dH and dV are calculated as shown in Expression 2, where dH and dV indicate the direction in which more gaps exist, i.e., the horizontal direction or the vertical direction.

$$dH=|G4-G6|+|B3-2\times B5+B7| \qquad \text{[Expression 2]}$$

$$dV=|G2-G8|+|B1-2\times B5+B9|$$

Symbol |x| represents the absolute value of x. The interpolation value Gh or Gv is used depending on the direction corresponding to the evaluation value dH or dV calculated in this manner, whichever is determined to be smaller or flatter.

On the other hand, a technique based on color correlation is described in, for example, Japanese Unexamined Patent Application Publication No. 11-215512. The technique described in this Patent Application Publication will now be described with reference to FIG. 33. FIG. 33 is an illustration for known interpolation based on color correlation.

As shown in FIG. 33, it is assumed that, in the vicinity of a pixel of interest X, a linear correlation as represented by Expression 3 using factors $\alpha qp$ and $\beta qp$ is established between Vp and Vq, which are respectively the component values of any two color component types p and q selected from among the color components of the color filters included in the image pickup element (e.g., r, g, and b for color filters on a primary-color system).

$$Vq=\alpha qp\times Vp+\beta qp \qquad \text{[Expression 3]}$$

Here, p and q are one of r, g, and b, if the color filters included in the image pickup element are based on, for example, the primary-color system, and the component values Vp and Vq corresponding to the color components p and q, respectively, are values of pixels in a neighborhood of the pixel of interest X.

Then, the pixels in a neighborhood U determined in the vicinity of the pixel of interest X are classified into three subsets Ur, Ug, and Ub, according to the obtained color component type r, g, or b. The factors $\alpha qp$ and $\beta qp$ are estimated from Expression 4 shown below based on the average Ac (where, c is one of r, g, and b) and the standard deviation Sc (where, c is one of r, g, and b) of the pixel values in each of the subsets.

$$\alpha qp=Sq/Sp,\ \beta qp=Aq-\alpha qpAp \qquad \text{[Expression 4]}$$

This technique is based on the concept that the ratio of the width of the distribution of the color component q (standard deviation Sq) to the width of the distribution of color component p (standard deviation Sp) gives the gradient $\alpha qp$ of the linear correlation shown in Expression 3 and that, furthermore,.a straight line with the obtained gradient $\alpha qp$ passes through a point plotted by the mean value Ap of the color component p and the mean value Aq of the color component q.

Then, based on the estimated factors $\alpha qp$ and $\beta qp$, the value Xm of a missing color component m at the pixel of interest X is calculated from the value Xe of the color component e obtained at the pixel of interest X, as shown in Expression 5 below.

$$Xm=\alpha me\times Xe+\beta me \qquad \text{[Expression 5]}$$

Here, m and e are each one of r, g, and b.

As described above, the known technique based on color correlation is characterized in that the correlation between pixel values of different color components in the neighborhood of the pixel of interest can be estimated.

On the other hand, in an actual image pickup system, variance in sensitivity may occur between even pixels that use the same color filters and in fact should produce the same color components, due to a difference in gain between lines or slightly different spectral characteristics of the used color filters.

In all the above-described techniques, the color component obtained at the pixel of interest is used without any change for the interpolation result. Hence, when a missing color component at the pixel of interest is to be calculated, information regarding the pixel of interest itself is reflected in the result. In general, it is more efficient to use, for the interpolation result, information regarding the original color component obtained at each pixel without any change. If the sensitivity differs at pixels where the same color components are obtained, however, this processing causes the sensitivity variance between the pixels to be directly reflected in the interpolation result. As a result, a side effect, such as the appearance of a slight grid pattern, occurs.

SUMMARY OF THE INVENTION

An object of the present invention is to provide an image processing apparatus and an image processing program which moderates the effect of variation in sensitivity between pixels, if any, to achieve high-accuracy interpolation.

Simply, the present invention is an image processing apparatus for processing an image of pixels each lacking at least one type of color component, the image being produced by capturing an optical image with a single-chip image pickup system, a two-chip image pickup system, or a three-chip pixel-shifting image pickup system. This image processing apparatus includes sensitivity correcting means for correcting a difference in sensitivity between pixels having the same color components and interpolating means for compensating the image corrected by the sensitivity correcting means for the missing color component of each pixel.

The present invention is an image processing apparatus for processing an image of pixels each lacking at least one type of color component, the image being produced by capturing an optical image with a single-chip image pickup system, a two-chip image pickup system, or a three-chip pixel-shifting image pickup system. This image processing apparatus includes determining means for determining the degree of sensitivity difference between pixels having a specified type of color component in a predetermined neighborhood of a pixel of interest and interpolating means for carrying out processing for compensating for the missing color component of the pixel of interest, the interpolating means being capable of changing the processing according to a result of determination by the determining means when the processing is carried out.

The present invention is an image processing apparatus for processing an image of pixels each lacking at least one type of color component, the image being produced by capturing an optical image with a single-chip image pickup system, a two-chip image pickup system, or a three-chip pixel-shifting image pickup system. This image processing apparatus includes interpolating means for compensating for the missing color component of each pixel and post-interpolation correcting means for correcting a result by the interpolating means.

The present invention is an image processing program for enabling a computer to process an image of pixels each lacking at least one type of color component, the image being produced by capturing an optical image with a single-chip image pickup system, a two-chip image pickup system, or a three-chip pixel-shifting image pickup system. This image processing program enables the computer to function as sensitivity correcting means for correcting a difference in sensitivity between pixels having the same color components and interpolating means for compensating the image corrected by the sensitivity correcting means for the missing color component of each pixel.

The present invention is an image processing program for enabling a computer to process an image of pixels each lacking at least one type of color component, the image being produced by capturing an optical image with a single-chip image pickup system, a two-chip image pickup system, or a three-chip pixel-shifting image pickup system. This image processing program enables the computer to function as determining means for determining the degree of sensitivity difference between pixels having a specified type of color component in a predetermined neighborhood of a pixel of interest and interpolating means for carrying out processing for compensating for the missing color component of the pixel of interest, the interpolating means being capable of changing the processing according to a result of determination by the determining means when the processing is carried out.

Further, the present invention is an image processing program for enabling a computer to process an image of pixels each lacking at least one type of color component, the image being produced by capturing an optical image with a single-chip image pickup system, a two-chip image pickup system, or a three-chip pixel-shifting image pickup system. This image processing program enables the computer to function as interpolating means for compensating for the missing color component of each pixel and post-interpolation correcting means for correcting a result by the interpolating means.

The above and other objects, features and advantages of the invention will be become more clearly understood from the following description referring to the accompanying drawings.

BRIEF DESCRIPTION OF THE DRAWINGS

FIG. 4 is a diagram showing the classification of pixels in the G-gap detection circuit and the G interpolation circuit according to Embodiment 2.

FIG. 6 is an illustration for the processing in step S16 of the processing by the G interpolation circuit shown in FIG. 5.

FIGS. 7A to 7D are diagrams showing the direction in which weighting is calculated by a weighting-calculation circuit according to Embodiment 2.

FIGS. 9A and 9B are illustrations for the selection of pixels in step S31 in the processing of the RB interpolation circuit shown in FIG. 8.

FIG. 14 is a diagram showing the numbers of pixels used for processing by the correction circuit according to Embodiment 3.

FIGS. 19A and 19B are illustrations for a G gap according to Embodiment 4.

FIG. 24 is an illustration for combination average calculated by the combination average calculation circuit according to Embodiment 4.

DETAILED DESCRIPTION OF PREFERRED EMBODIMENTS

Embodiments according to the present invention will now be described with reference to the drawings.

Embodiment 1

Figure 1:
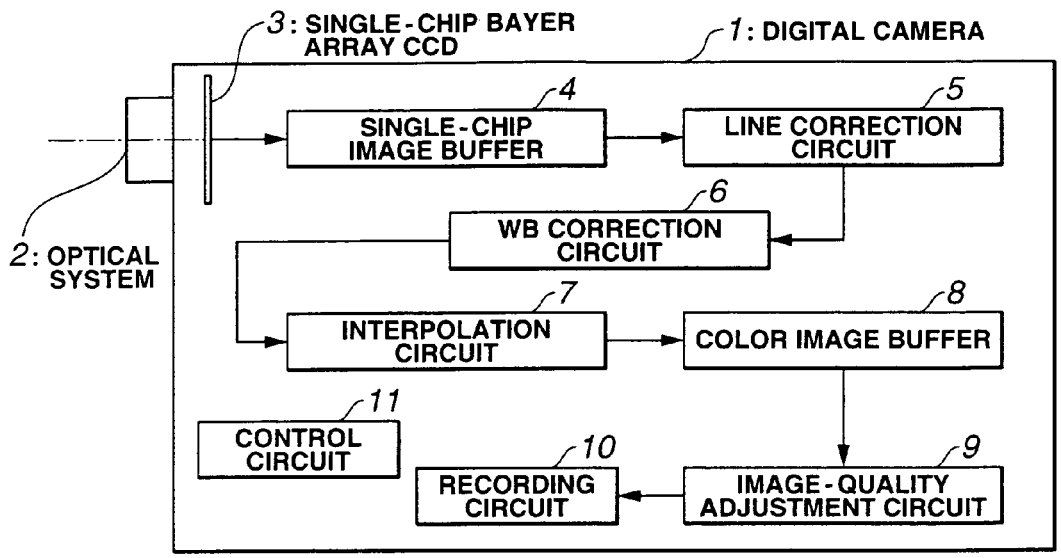
FIG. 1 is a block diagram showing the structure of a digital camera according to Embodiment 1 of the present invention.

FIG. 1 shows Embodiment 1 according to the present invention. FIG. 1 is a block diagram showing the structure of a digital camera.

In this Embodiment 1, an image processing apparatus according to the present invention is applied to a digital camera.

As shown in FIG. 1, a digital camera 1 includes an optical system 2, a single-chip Bayer array CCD 3, a single-chip image buffer 4, a line correction circuit 5, a WB correction circuit 6, an interpolation circuit 7, a color image buffer 8, an image-quality adjustment circuit 9, a recording circuit 10, and a control circuit 11.

The optical system 2 is used to converge the luminous flux of an object.

The single-chip Bayer array CCD 3 applies photoelectric conversion to the image of the object focused by the optical system 2 and outputs an image pickup signal.

The single-chip image buffer 4 temporarily stores image data output from the single-chip Bayer array CCD 3 and then digitized by, for example, an A/D conversion circuit (not shown in the figure).

The line correction circuit 5 is sensitivity-correcting means for correcting the difference in gain between lines on an image stored in the single-chip image buffer 4.

The WB correction circuit 6 applies white balance processing to image data output from the line correction circuit 5.

The interpolation circuit 7 is interpolating means for producing color image data by interpolating a missing color component at each pixel of single-chip image data output from the WB correction circuit 6, based on information regarding neighborhood pixels.

The color image buffer 8 temporarily stores three-chip color image data interpolated by the interpolation circuit 7.

The image-quality adjustment circuit 9 applies image-quality adjustment, such as color conversion or edge enhancement, to a color image stored in the color image buffer 8.

The recording circuit 10 records three-chip color image data whose image quality is adjusted by the image-quality adjustment circuit 9.

The control circuit 11 is controlling means for carrying out overall control of the digital camera 1, including the circuits described above.

The operation of the digital camera 1 will now be described below.

When a shutter button (not shown in the figure) provided in the digital camera 1 is pressed by a user, an optical image via the optical system 2 is captured by the single-chip Bayer array CCD 3, and then a single-chip image with only one color component type per pixel is stored in the single-chip image buffer 4.

Then, the WB correction circuit 6 operates to calculate a ratio Crg between the R component and the G component and a ratio Cbg between the B component and the G component of a white object as white balance factors. In this embodiment, pixel values in each block of a predetermined size are read out from the single-chip image buffer 4, and the average of the pixel values is calculated for each type of the color components obtained at the pixels in the block.

As a result, an RGB value of the averaged color in each block is obtained. Furthermore, the ratio between the R component and the G component and the ratio between the B component and the G component are calculated to select only blocks where these ratios satisfy a predetermined relationship. Then, the ratio between the R component and the G component and the ratio between the B component and the G component in the selected blocks are further averaged to obtain the final white balance factors Crg and Cbg. This technique is well known. It is noted that when a pixel value is read out from the single-chip image buffer 4 in this calculation, the line correction circuit 5 operates to correct the pixel value.

More specifically, the line correction circuit 5 corrects gain gap between the even-numbered lines and the odd-numbered lines generated when a signal is read out from the single-chip Bayer array CCD 3, and the circuit preserves factors (a, b) for the correction. These factors are pre-calculated so as to satisfy Expression 6, where V1 is the average of the pixel values of the pixels having the G component obtained on the odd-numbered lines and V2 is the average of the pixel values of the pixels having the G component obtained on the even-numbered lines, where the pixel values are acquired from a uniform gray object and stored in the single-chip image buffer 4.

$$V2 = a \times V1 + b \quad \text{[Expression 6]}$$

Using this factor, in the line correction circuit 5, the pixel value v of each pixel having the G component obtained on the odd-numbered lines is corrected as shown in Expression 7 according to the sensitivity of the even-numbered lines.

$$v' = a \times v + b \quad \text{[Expression 7]}$$

This corrected pixel value (correction value) v' is output to the WB correction circuit 6.

When the processing of the WB correction circuit 6 as described above is completed, the white balance factors Crg and Cbg are preserved in the WB correction circuit 6.

Then, the interpolation circuit 7 carries out interpolation for each pixel in the single-chip image buffer 4. The algorithms for interpolation carried out by the interpolation circuit 7 are the same as those described in Japanese Unexamined Patent Application Publication No. 8-298669. In this embodiment, however, pixels are read out five lines at a time from the single-chip image buffer 4 and the pixel values are stored in an internal buffer (not shown) in the interpolation circuit 7 to carry out interpolation on data in the buffer.

Then, when data is to be transferred to the internal buffer from the single-chip image buffer 4, the line correction circuit 5 and the WB correction circuit 6 operate to change the pixel value read out from the single-chip image buffer 4.

In this case, the following calculation is carried out to obtain a correction result (correction value) v' of the pixel value v read out by the line correction circuit 5 from the single-chip image buffer 4.

$$v' = a \times v + b \text{ (when the read-out pixel has the G component obtained on the odd-numbered lines)} \quad \text{[Expression 8]}$$

$$v' = v \text{ (otherwise)}$$

Furthermore, the WB correction circuit 6 calculates an output v'', as shown below, for the correction result (correction value) v' by the line correction circuit 5 to write v'' in the internal buffer of the interpolation circuit 7.

$$v'' = v' \text{ (when the G component is obtained in the read-out pixel)} \quad \text{[Expression 9]}$$

$$v'' = Crg \times v' \text{ (when the R component is obtained in the read-out pixel)}$$

$$v'' = Cbg \times v' \text{ (when the B component is obtained in the read-out pixel)}$$

Thereafter, the color image output to the color image buffer 8 by the interpolation circuit 7 is subjected to processing, such as color conversion, edge enhancement, and grayscale conversion, by the image-quality adjustment circuit 9 and then stored on a recording medium (not shown in the figure) by the recording circuit 10. In this manner, image pickup operation by the digital camera 1 is completed.

Although this Embodiment 1 has described the basic structure and processing, many modifications of this embodiment are conceivable. For the processing by the interpolation circuit 7, any processing that uses the pixel value of a pixel where the color component G is obtained as the value of the G component after interpolation.

In addition, although this embodiment has been described by way of an example of a single-chip image pickup system, the same processing can be applied to a two-chip image pickup system or a three-chip pixel-shifting image pickup system.

For example, in the case of a two-chip image pickup system, the G component is obtained at all pixels from one of the two image pickup elements, and the R component and the B component are obtained from the other image pickup element in a checkered pattern. For example, for correction of difference in sensitivity of the R component, the same technique as in the correction of the sensitivity of the G component obtained in a checkered pattern with a single-chip Bayer array CCD 3 in this embodiment can be applied.

Furthermore, some types of three-chip pixel-shifting image pickup systems acquire the G component with two of three image pickup elements and acquire the R and B components in a checkered pattern with the remaining one to generate a high-definition luminance component from this information. In this case also, correction of the sensitivity of the R and B components obtained in a checkered pattern can be carried out in the same manner as described above.

According to Embodiment 1 described above, because processing by the interpolation circuit, serving as interpolating means, is carried out after correction has been carried out by the line correction circuit, serving as sensitivity-correcting means, an image after interpolation is protected from being influenced by a difference in sensitivity between pixels where the same color components are obtained, particularly even if the sensitivity differs between lines. As a result, a higher-quality image can be produced.

Embodiment 2

Figure 2:
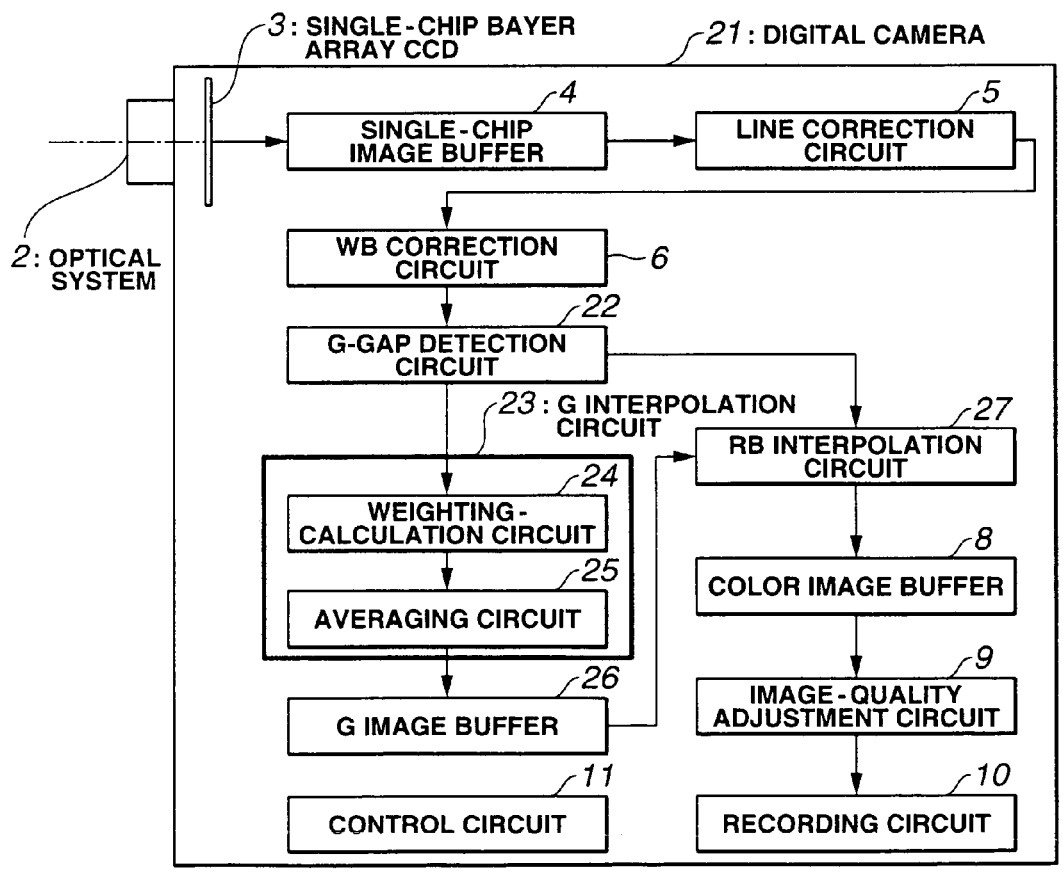
FIG. 2 is a block diagram showing the structure of a digital camera according to Embodiment 2 of the present invention.
Figure 3:
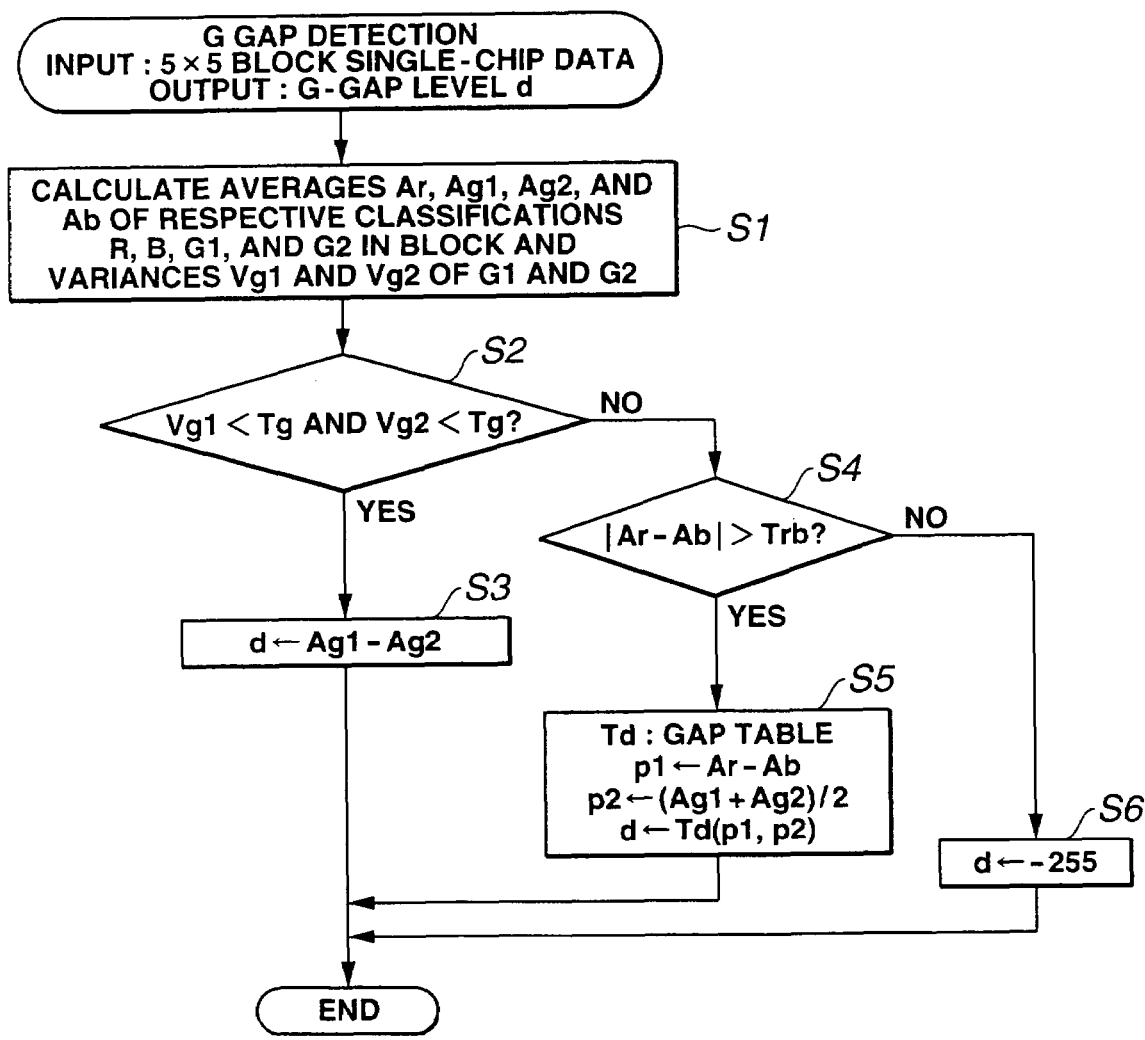
FIG. 3 is a flowchart showing processing of a G-gap detection circuit according to Embodiment 2.
Figure 5:
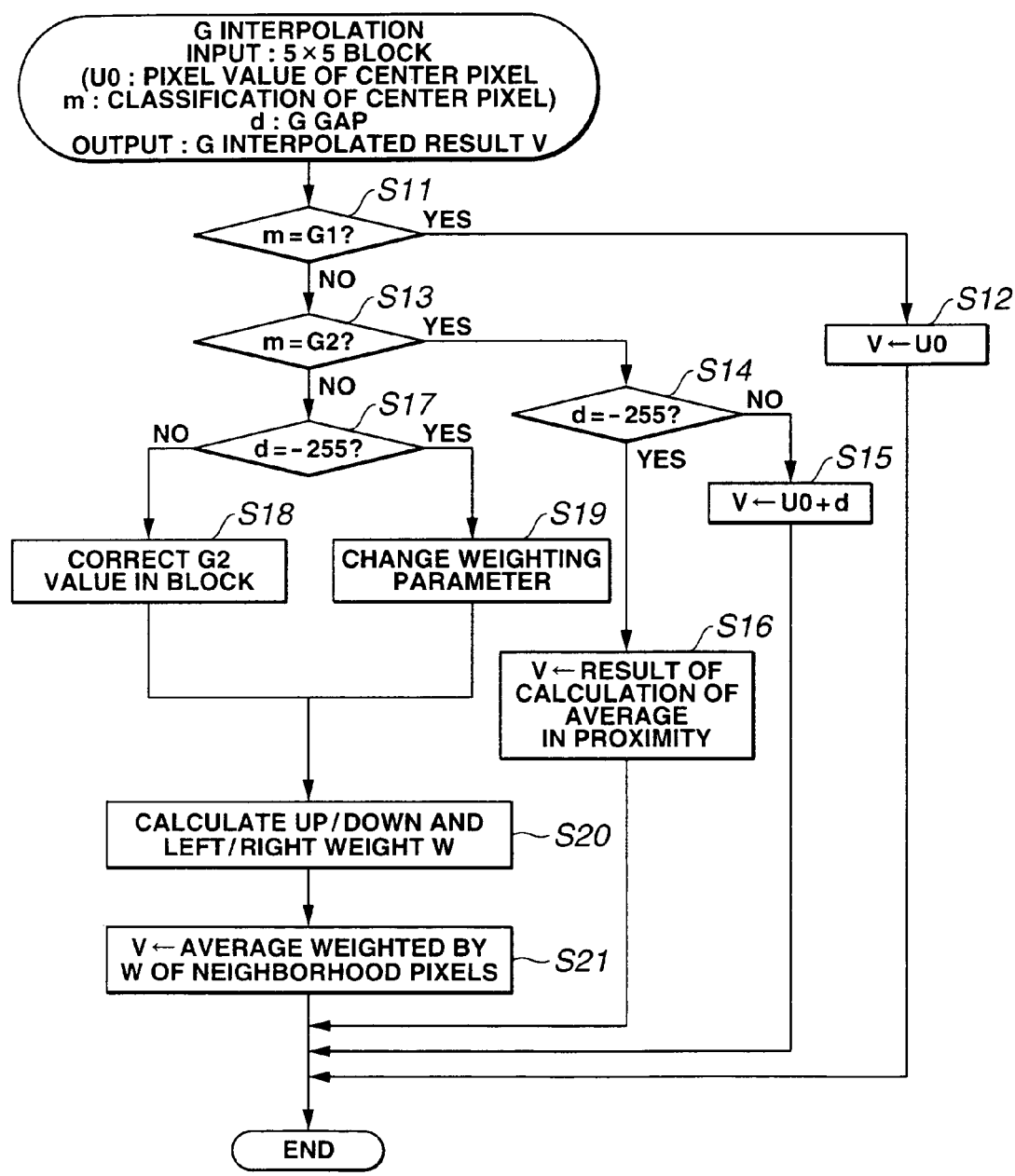
FIG. 5 is a flowchart showing the processing of the G interpolation circuit according to Embodiment 2.
Figure 8:
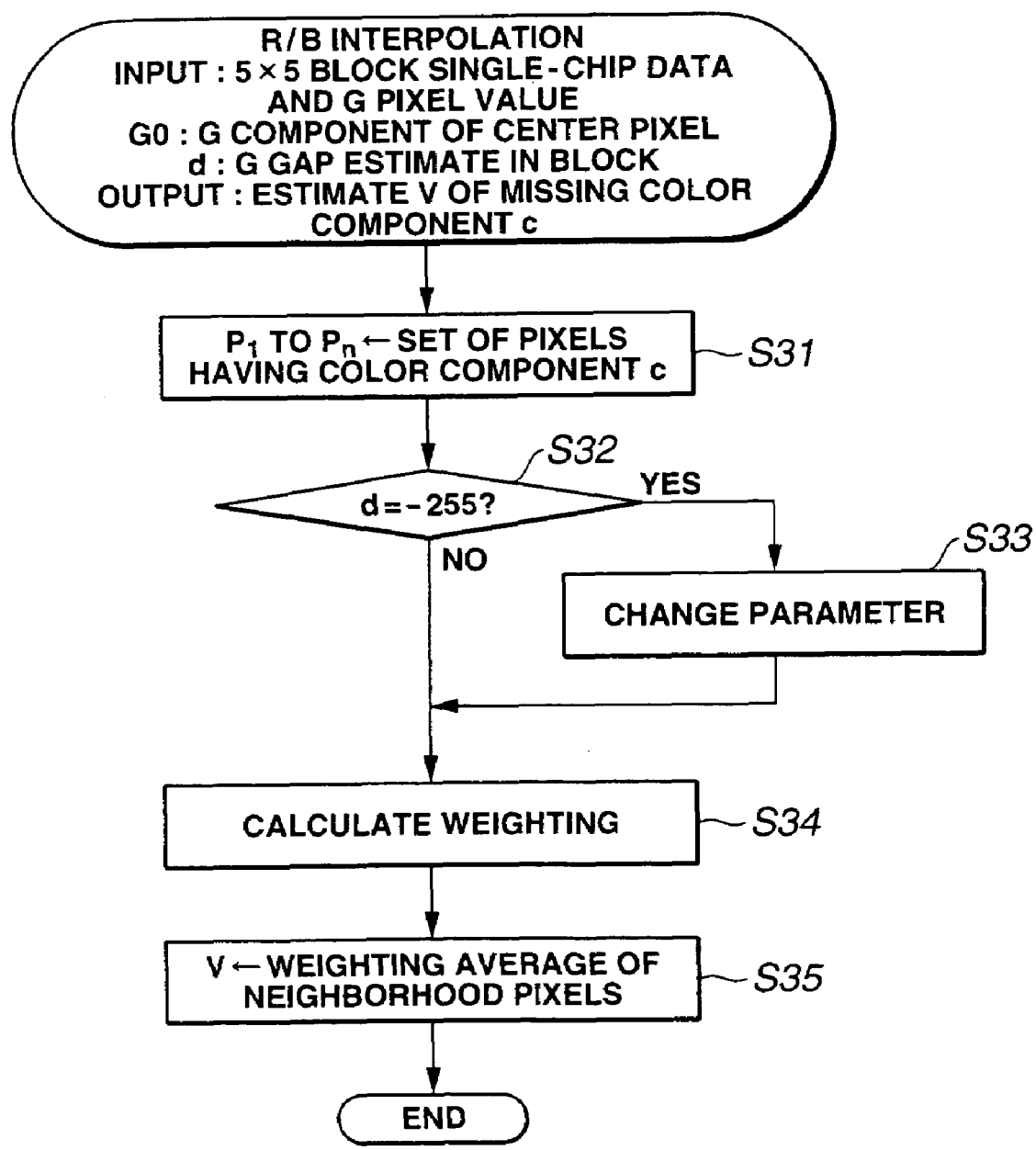
FIG. 8 is a flowchart showing the processing of the RB interpolation circuit according to Embodiment 2.
Figure 10:
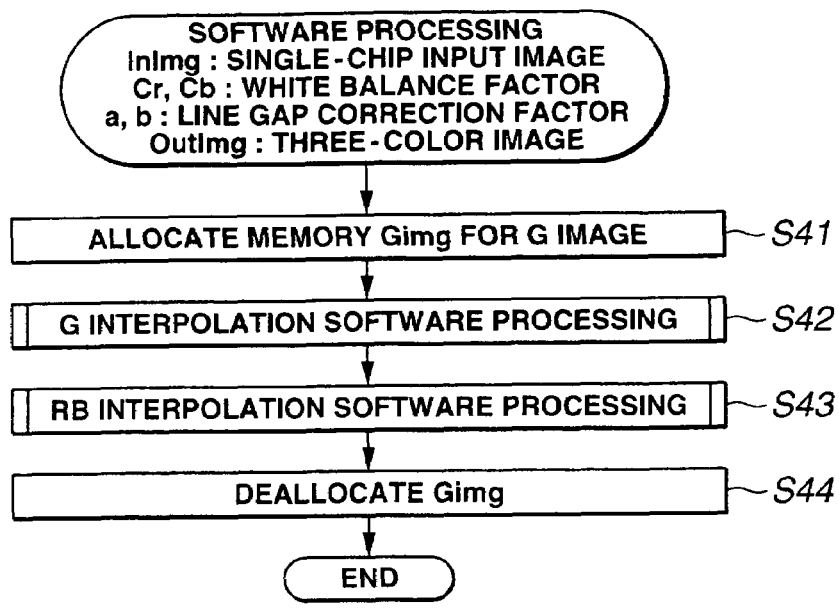
FIG. 10 is a flowchart showing the software processing carried out by a computer according to Embodiment 2.
Figure 11:
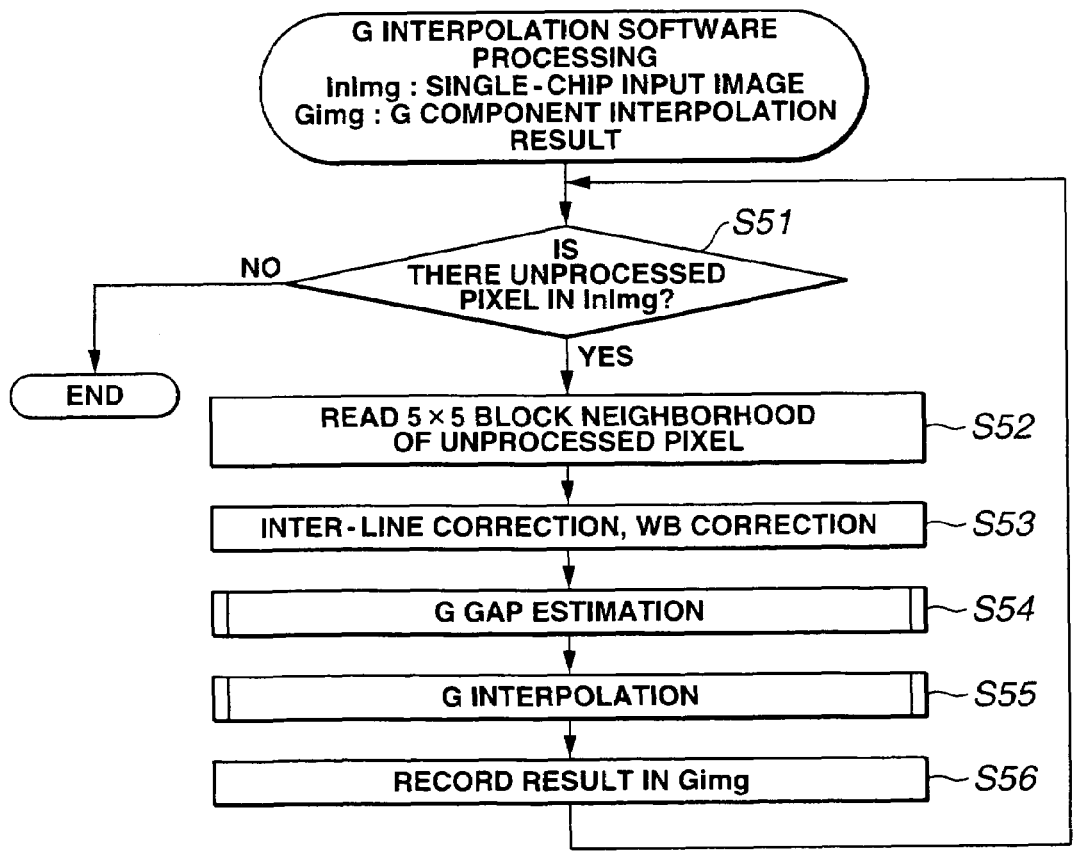
FIG. 11 is a flowchart showing the G interpolation software processing carried out by a computer according to Embodiment 2.
Figure 12:
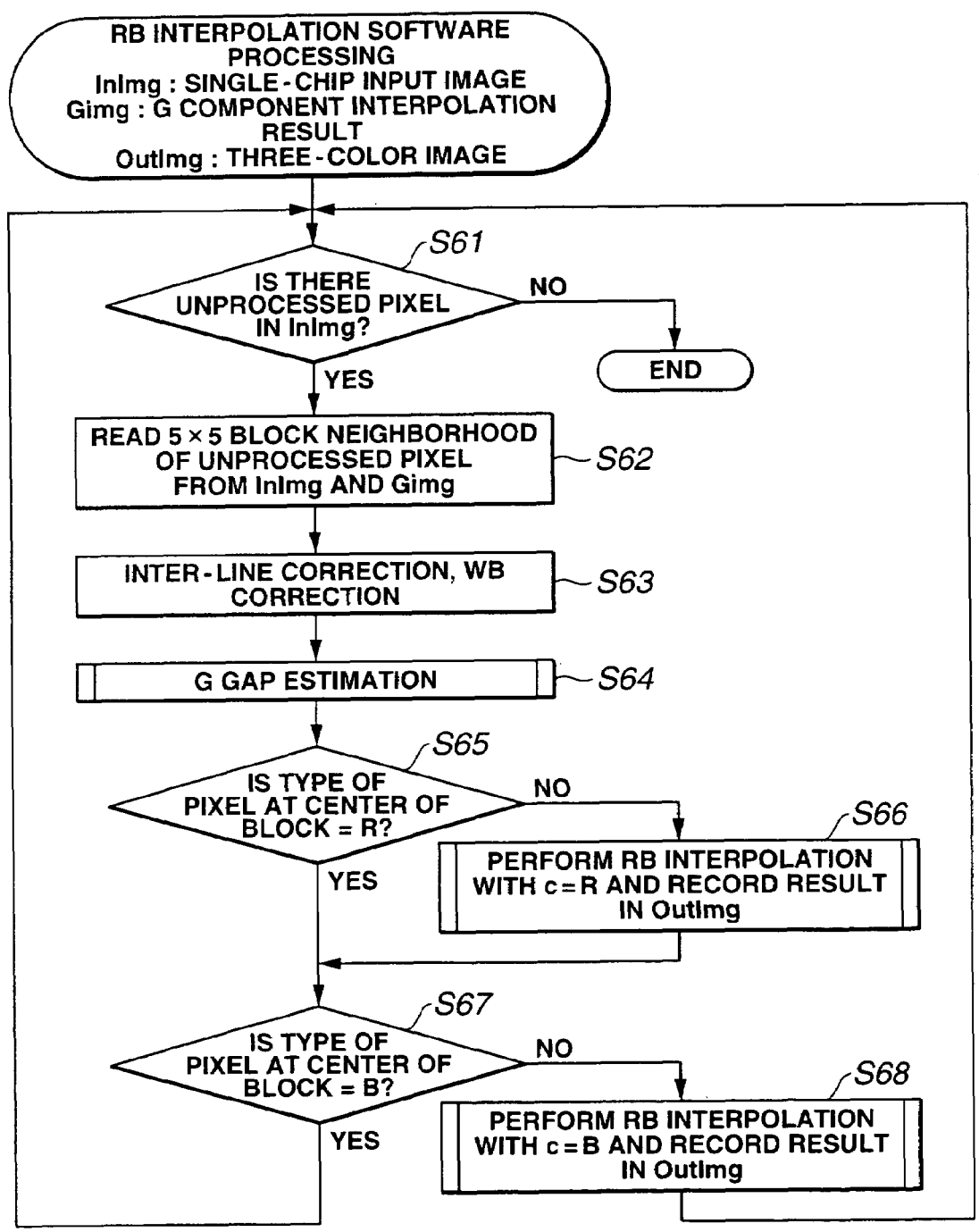
FIG. 12 is a flowchart showing the RB interpolation software processing carried out by a computer according to Embodiment 2.

FIGS. 2 to 12 show Embodiment 2 according to the present invention. FIG. 2 is a block diagram showing the structure of a digital camera, FIG. 3 is a flowchart showing processing of a G-gap detection circuit, FIG. 4 is a diagram showing the classification of pixels in the G-gap detection circuit and the G interpolation circuit, FIG. 5 is a flowchart showing the processing by the G interpolation circuit, FIG. 6 is an illustration for the processing in step S16 of the processing by the G interpolation circuit shown in FIG. 5, FIGS. 7A to 7D are diagrams showing the direction in which weighting is calculated by a weighting-calculation circuit, FIG. 8 is a flowchart showing the processing by the RB interpolation circuit, FIGS. 9A and 9B are illustrations for the selection of pixels in step S31 of the processing by the RB interpolation circuit shown in FIG. 8, FIG. 10 is a flowchart showing the software processing carried out by a computer, FIG. 11 is a flowchart showing the G interpolation software processing carried out by a computer, and FIG. 12 is a flowchart showing the RB interpolation software processing carried out by a computer.

In this Embodiment 2, the same components as those in the Embodiment 1 are represented by the same reference numerals, and will not be described. The following description mainly focuses on the differences.

In this Embodiment 2, an image processing apparatus is applied to a digital camera, as in Embodiment 1 described above.

A digital camera 21 according to this Embodiment 2 differs from the digital camera 1 according to Embodiment 1 in that a G-gap detection circuit 22, serving as determining means and as feature-value calculating means, is additionally provided. Furthermore, the digital camera 21 includes a G interpolation circuit 23, serving as interpolating means, and a G image buffer 26, as well as an RB interpolation circuit 27, serving as interpolating means, in place of the interpolation circuit 7.

The G interpolation circuit 23 includes a weighting-calculation circuit 24, serving as weighted-averaging means, for calculating the weighting for the pixels to be corrected based on the output from the G-gap detection circuit 22 and an averaging circuit 25, serving as weighted-averaging means, for calculating the weighted mean value based on the weighting calculated by the weighting-calculation circuit 24 to apply the mean value to the pixel value of the pixel to be corrected and outputting the result to the G image buffer 26.

The operation of the digital camera 21 will now be described with emphasis centered mainly on the differences from Embodiment 1.

When the shutter button is pressed by a user, in the same manner as in the Embodiment 1, an optical image via the optical system 2 is captured by the single-chip Bayer array CCD 3, and a single-chip image with only one color component type per pixel is stored in the single-chip image buffer 4.

Then, the line correction circuit 5 and the WB correction circuit 6 operate in the same manner as in the Embodiment 1 to calculate the white balance factors Crg and Cbg.

Then, the G interpolation circuit 23 operates. At this time, a block composed of 5×5 pixels neighboring each pixel of image data stored in the single-chip image buffer 4 is read into an internal buffer provided in the G interpolation circuit 23. At this time, in the same manner as in the Embodiment 1, the line correction circuit 5 and the WB correction circuit 6 operate to correct the pixel values. Furthermore, the G-gap detection circuit 22 operates to calculate an estimated value of the gap between even-numbered lines and odd-numbered lines in pixels where the G component is obtained.

Gap estimation by the G-gap detection circuit 22 will now be described with reference to the flowchart in FIG. 3.

The G-gap detection circuit 22 classifies the respective pixels in a block composed of 5×5 pixels read into the internal buffer into the color components obtained, and calculates the mean value of pixel values of each color component. In this case, the G component is further classified into two types: G1 and G2, as shown in FIG. 4. G1 is assigned if the color components obtained from the horizontal neighborhood pixels are R. G2 is assigned if the color components obtained from the horizontal neighborhood pixels are B. Thus, four types of mean values are calculated. That is, the mean value of the R components is Ar, the mean value of the B components is Ab, the mean value of the G1 components is Ag1, and the mean value of the G2 components is Ag2. Then, for the pixels classified into G1 or G2, the variances Vg1 and Vg2 of the pixel values are also calculated for the classifications (step S1).

Next, a determination is made as to whether or not both of the variances Vg1 and Vg2 are a threshold T or smaller (step S2).

When both are the threshold T or smaller and a determination is made that the block is relatively flat, a gap estimate d is calculated as the difference between the mean values of the classifications G1 and G2 (Ag1−Ag2) to complete the processing (step S3).

Furthermore, if at least one of the variances Vg1 and Vg2 exceeds the threshold T in the step S2, it is not clear whether or not the block is flat. Thus, furthermore, how much the R component differs from the B component in the block is evaluated based on whether the difference |Ar−Ab| between the mean value Ar of the pixels whose R component is obtained and the mean value Ab of the pixels whose B component is obtained is greater than a predetermined threshold Trb (step S4).

Here, if the difference |Ar−Ab| is greater than the threshold Trb, the processing described below is carried out.

First, in this embodiment, the G-gap detection circuit 22 preserves a table Td obtained from objects with various colors by measuring a gap d in the G component between lines of each image. This is because a gap may be generated in pixel values of pixels whose G component is obtained depending on the even-numbered or odd-numbered lines, even though sensitivity correction is carried out between lines of image data by the line correction circuit 5 before processing is carried out by the WB correction circuit 6.

Then, a possible amount d of G gap is calculated by using two indices p1 and p2 and by referring to the table, as in d=Td (p1, p2), where p1 is a difference (feature value) between the mean value Ar of the pixels whose R component is obtained and the mean value Ab of the pixels whose B component is obtained and p2 is the average (feature value) of the G component including both G1 and G2. Here, after an appropriate estimate d of G gap is obtained with reference to this table, processing for detecting this G gap ends (step S5).

Furthermore, even if a G gap is generated, the magnitude of the gap cannot be estimated from the data in the block, if the difference |Ar−Ab| is the threshold Trb or smaller in the step S4. Thus, the amount d of G gap is set to −255, which indicates that estimation is not possible and the processing ends (step S6).

In this manner, when a readout of the block of 5×5 pixels and an estimate d for the amount of gap in G component between lines are obtained, the G interpolation circuit 23 calculates the G component at the center pixel in the block and writes the result in the G image buffer 26. This processing will now be described with reference to the flowchart in FIG. 5.

When processing starts, a determination is made as to whether or not the classification m of the center pixel in a block is G1 of the classification shown in FIG. 4 (step S11). As illustrated in FIG. 4, this classification m represents one of the four types R, G1, G2, and B according to the type of the obtained color component and the type of the horizontal neighborhood pixels.

Here, if the classification m is G1, a value V of the G component at the center pixel is set as the pixel value U0 at the center pixel in the block (step S12), and then the processing ends.

Furthermore, in the step S11, if the classification m of the center pixel in the block is not G1, a further determination is made as to whether or not the classification m is G2 of the classification shown in FIG. 4 (step S13).

Here, if the classification m of the center pixel in the block is G2, a determination is made as to whether or not the G-gap estimate d is −255, i.e., whether or not the estimation of the G gap is disabled (step S14).

If the G-gap estimate d is not −255, the value V of the G component of the center pixel is estimated as V=U0+d based on the pixel value U0 of the center pixel in the block and the G-gap estimate d (step S15), and then the processing ends.

On the other hand, if the G-gap estimate d is −255 in the step S14, the 3×3 pixels neighborhood of the center pixel (pixel having a pixel value of U0) is taken as shown in FIG. 6, and the difference duj between each of pixel values U1 to U4 of the pixels whose d component is obtained in the four corners of the neighborhood and the pixel value U0 of the relevant center pixel is calculated as described below.

$$duj = |U0 - Uj|$$

Here, j is an integer from one to four. The value of the G component of the center pixel is obtained from the expression V=(U0+Uj)/2, where j is the integer which gives the minimum of these differences (step S16), and the processing ends.

If the classification m of the center pixel in the block is not G2 in the step S13, a determination is made as to whether or not the G-gap estimate d is −255, i.e., whether or not the estimation of the G gap is disabled (step S17).

Here, if the G-gap estimate d is not −255, the pixel value Uk of a pixel k classified as G2 in the block is corrected as Uk=Uk+d (step S18).

Furthermore, if the G-gap estimate d is −255 in the step S17, a parameter α used in the calculation in step S20 described below is reduced to half a predetermined value, and a parameter β used in the calculation in step S20 is increased to twice a predetermined value (step S19).

When the step S18 or step S19 is completed, the weighting-calculation circuit 24 calculates a weighting Wj (j is an integer from one to four) in each of the up/down and left/right directions of the center pixel, as shown in FIGS. 7A to 7D, based on Expression 10.

$$E1 = |B5 - B7| + \quad \text{[Expression 10]}$$
$$\alpha \times (|G4 - G6| - \min(|G4 - G6|, |G2 - G8|)) + \beta$$
$$E2 = |B5 - B9| +$$
$$\alpha \times (|G2 - G8| - \min(|G4 - G6|, |G2 - G8|)) + \beta$$
$$E3 = |B5 - B3| +$$
$$\alpha \times (|G4 - G6| - \min(|G4 - G6|, |G2 - G8|)) + \beta$$
$$E4 = |B5 - B1| +$$
$$\alpha \times (|G2 - G8| - \min(|G4 - G6|, |G2 - G8|)) + \beta$$
$$Wj = (1/Ej)/(\Sigma(1/Ek))$$

The parameters α and β in Expression 10 are constants, and take a predetermined value or a value changed in the step S19. In the calculation of W, j is an integer from one to four, as described above, and the sum of the denominators is calculated from an integer k from one to four. It is noted that this expression is for the arrangements in FIGS. 7A to 7D, and represents an example where the center pixel is classified as B. If the center pixel is classified as R, B and R are exchanged for the calculation (step S20).

Next, the averaging circuit 25 applies weighting to the pixel values of the pixels existing in each direction using the weighting Wj calculated in the step S20 to calculate the final G component of the center pixel from Expression 11 shown below (step S21).

$$Vg = W1 \times G6 + W2 \times G8 + W3 \times G4 + W4 \times G2 \quad \text{[Expression 11]}$$

$$Vb = W1 \times B7 + W2 \times B9 + W3 \times B3 + W4 \times B1$$

$$V = Vg + (Vb - B5)/2$$

When a series of processing as described above is completed for all pixels of the image in the single-chip image buffer 4, an image in which the missing G component is compensated for is obtained in the G image buffer 26. Then, the RB interpolation circuit 27 operates to generate a color image free from missing color components at all pixels and stores the color image in the color image buffer 8.

More specifically, the RB interpolation circuit 27, just like the G interpolation circuit 23, reads out a block of 5×5 pixels with respect to each pixel in the single-chip image buffer 4. During this readout, in the same manner as with the G interpolation circuit 23, the line correction circuit 5, the WB correction circuit 6, and the G-gap detection circuit 22 operate to produce the changed pixel values in the block of 5×5 pixels in an internal buffer (not shown in the figure) of the RB interpolation circuit 27 and also the G-gap estimate d in the block.

Then, the RB interpolation circuit 27 reads the values of the G components at the pixel locations corresponding to the readout block from the G image buffer 26, and stores them in an internal buffer (not shown in the figure).

Thereafter, the RB interpolation circuit 27 obtains a missing color component of the center pixel by means of processing as shown in FIG. 8. The processing shown in FIG. 8 calculates the value of the specified color component c of the center pixel in the block by means of average weighting from the data in the internal buffer.

At this time, the RB interpolation circuit 27 carries out the processing shown in FIG. 8 with c=B if the center pixel of the block is classified as R, with c=R if the center pixel of the block is classified as B, and with each of the specifications c=R and c=B if the center pixel of the block is classified as G1 or G2. This is necessary because a missing color component is different depending on the pixel location.

The processing shown in FIG. 8 will now be described step by step.

When the processing starts, pixels P1 to Pn (n is an integer) having the specified color component c in the block are obtained (step S31). FIG. 9B shows the result with c=R in the block laid out as shown in FIG. 9A. In this case, n is six to enable the pixels P1 to P6 to be obtained.

Then, a determination is made as to whether or not the G-gap estimate d is −255, i.e., whether or not the estimation of the G gap is disabled (step S32).

Here, if the G-gap estimate d is −255, a parameter γ used in the calculation in step S34 described below is increased to twice a predetermined value, and a parameter δ used in the calculation in step S35 described below is decreased to half a predetermined value (step S33).

When the processing in this step S33 ends or if the G-gap estimate d is not −255 in the step S32, the weighting Wj assigned to the pixel Pj is calculated as shown in Expression 12 (step S34).

$$Ej = |Gj - G0| + \gamma \quad \text{[Expression 12]}$$

$$Wj = (1/Ej)/(\Sigma(1/Ek))$$

Here, in the calculation of W, j is an integer from one to four, and the sum of the denominators is calculated from an integer k from one to four. In addition, γ in this Expression 10 is a constant, and takes a predetermined value or a value changed in the step S33.

Then, the value V of a missing color component c at the center pixel is calculated as shown in Expression 13. In this Expression 13, Cj and Gj are the values of the color components c and G obtained at the pixel Pj (step S35).

$Vc = \Sigma Wj \times Cj$ (j is an integer from one to n)     [Expression 13]

$Vg = G0 - \Sigma Wj \times Gj$ (j is an integer from one to n)

$V = Vc + \delta \times Vg$

Here, δ is a constant, and takes a predetermined value or a value changed in the step S33.

When the processing up to now is completed for all pixels of the image in the single-chip image buffer 4, a color image where missing color components are restored at all pixels, i.e., a so-called three-chip color image, is obtained in the color image buffer 8.

The subsequent operation is the same as in the Embodiment 1. The obtained color image is subjected to processing, such as color conversion, edge enhancement, and grayscale conversion, by the image-quality adjustment circuit 9 and recorded by the recording circuit 10 on a recording medium (not shown in the figure) to complete image pickup operation by the digital camera 21.

In the description so far, processing is carried out with hardware (e.g., circuits) in the digital camera 21 functioning as an image processing apparatus. This kind of processing, however, can also be carried out with an image-processing program on a computer such as a PC (personal computer). FIGS. 10 to 12 are flowcharts showing an example of software processing carried out on a computer.

This software processing processes images stored in the memory InImg, i.e., images which have only just been obtained by the single-chip Bayer array CCD 3 and have only one color component type at each pixel, and then outputs three-color images to the memory OutImg. It is noted that the white balance factors Cr and Cb and the inter-line gain correction factors a and b are given as parameters.

Each step of the flowcharts shown in FIGS. 10 to 12 will now be described.

First, FIG. 10 shows the outline of the flow of the software processing.

More specifically, when processing starts, the G component for all pixels is calculated in this processing, and thus the memory Gimg for storing the relevant calculation result is allocated (step S41).

Then, the G interpolation software processing is carried out, as described below with reference to FIG. 11 (step S42).

Furthermore, RB interpolation software processing is carried out, as described below with reference to FIG. 12 (step S43).

Then, the allocated memory Gimg is deallocated (step S44) and then this software processing ends.

G interpolation software processing in the step S42 will now be described in detail with reference to FIG. 11.

When processing starts, a determination is made as to whether or not unprocessed pixels exist in the memory InImg (step S51).

Here, if unprocessed pixels exist in the memory InImg, one of the unprocessed pixels is set as the pixel to be processed, and image data in the block of 5×5 pixels neighborhood of this pixel to be processed is read out (step S52).

Then, inter-line correction is carried out by executing the calculation based on Expression 8, and WB correction is also carried out by executing the calculation based on Expression 9 (step S53).

Furthermore, the gap estimate d is calculated by carrying out G-gap estimation as shown in FIG. 3 (step S54).

Based on the result of this G-gap estimate, G interpolation is carried out as shown in FIG. 5 (step S55), and the post-processing G interpolation result V is recorded as the pixel value at the location corresponding to the pixel processed in the memory Gimg (step S56), and then the flow returns to the step S51.

Furthermore, if processing of the images in the memory InImg is completed in the step S51, this processing ends.

RB interpolation software processing in the step S43 will now be described in detail with reference to FIG. 12.

When processing starts, a determination is made as to whether or not unprocessed pixels exist in the memory InImg (step S61).

Here, if unprocessed pixels exist in the memory InImg, one of the unprocessed pixels is set as the pixel to be processed, and the image data in the block of 5×5 pixels neighborhood of this pixel to be processed is read from the memory InImg and the memory Gimg (step S62).

Then, inter-line correction is carried out by executing the calculation based on Expression 8, and WB correction is also carried out by executing the calculation based on Expression 9 (step S63).

Furthermore, the gap estimate d is calculated by carrying out G-gap estimation as shown in FIG. 3 (step S64).

Thereafter, a determination is made as to whether or not the type of the center pixel in the block is R (step S65), and if the type is not R, RB interpolation is carried out with c=R as shown in FIG. 8, and the interpolation result is recorded as the R component of the corresponding pixel in the memory OutImg (step S66).

When this step S66 ends or if the type of the center pixel is R in the step S65, a determination is made as to whether or not the type of the center pixel in the block is B (step S67).

Here, if the type of the center pixel is B, the flow returns to the step S61. In contrast, if the type of the center pixel is not B, RB interpolation is carried out with c=B as shown in FIG. 8, the interpolation result is recorded as the B component of the corresponding pixel in the memory OutImg (step S68), and then the flow returns to the step S61.

Then, if the processing of the images in the memory InImg is completed in the step S61, this processing ends.

It is noted that some modifications of this embodiment are conceivable. One preferable modification is realized by providing the G interpolation circuit 23 and the RB interpolation circuit 27 with a function for generating images with fewer pixels than images preserved in the single-chip image buffer 4, where processing by the G-gap detection circuit 22 is skipped when this function is performed. A mode of outputting with fewer pixels is normally provided in digital cameras. In this case, the G interpolation circuit 23 and the RB interpolation circuit 27 carry out processing by reducing the number of pixels of an image while reading the image from the single-chip image buffer 4. Thus, because a difference in sensitivity of G pixels, if any, gives a smaller impact on the processing result, the processing efficiency can be improved and the power consumption can be reduced by aborting the processing by the G-gap detection circuit and outputting d=−255 as the gap estimate d depending on the pixel-skipping rate (i.e., if the reduction ratio is a predetermined threshold or smaller).

In addition, although this embodiment has been described by way of an example of a single-chip image pickup system, the same processing can be applied to a two-chip image pickup system or a three-chip pixel-shifting image pickup system.

For example, in the case of a two-chip image pickup system, the G component is obtained at all pixels from one of the two image pickup elements, and a checkered pattern of the R component and the B component are obtained from the other image pickup element. In this case, the processing from steps S1 to S3 in FIG. 3 is changed so as to detect the difference in mean value between the R pixels on the even-numbered lines and the R pixels on the odd-numbered lines to carry out correction of sensitivity difference according to the detected amount.

Furthermore, some types of three-chip pixel-shifting image pickup systems acquire the G component with two of three image pickup elements and acquire a checkered pattern of the R and B components with the remaining one to generate a high-definition luminance component from this information. In this case also, correction of sensitivity of the R and B components obtained in a checkered pattern can be carried out in the same manner as with the two-chip image pickup system.

Then, when sensitivity correction is to be carried out for the R component or the B component instead of the G component, the feature value of the specified color component is associated with the amount of sensitivity difference in the above-described table.

Furthermore, the weighting calculation method in the weighting-calculation circuit 24 and the averaging circuit 25, functioning as weighted-averaging means, can be replaced with another method, as long as the weighting is smaller for pixels with the type of color components determined to have a large difference in sensitivity by the G-gap detection circuit 22, functioning as determining means. For example, the weighting calculation expression may be another type of function expression other than Expression 10, i.e., a function for differences in pixel value between pixels with the same color component type in the neighborhood. However, if a determination is made by the G-gap detection circuit 22 that the difference in sensitivity is greater for a particular color component, the function expression is preferably changed such that the influence by the difference between pixel values of the relevant color component is less significant. Furthermore, the calculation of the weighting for pixels with the type of color components determined to have a difference in sensitivity by the G-gap detection circuit 22 is preferably carried out such that a uniform weighting is finally achieved between the G pixels. This can be achieved by adjusting β in Expression 10. Another calculation method can also be used.

According to this Embodiment 2, as in the Embodiment 1, even though the sensitivity is different at pixels with the same color components, because correction is carried out by the sensitivity-correcting means and then processing is carried out by the interpolating means, interpolated images are protected from being influenced by the difference in sensitivity. This produces a higher-quality image.

Furthermore, according to this Embodiment 2, a determination is made by the determining means as to whether or not there is a big difference in sensitivity of the pixels where the same color components are obtained before processing by the interpolating means is carried out. If a determination is made that there is a large difference in sensitivity, the processing by the interpolating means is changed to processing resistant to the influence of the relevant difference in sensitivity, that is, to processing where the originally obtained values of color components are corrected to a value that should be produced by the pixel of interest if the pixel of interest has a predetermined reference sensitivity so that the corrected values are used for the result of interpolation.

This enables the finally produced images to have improved image quality without a significant decrease in the processing efficiency.

In addition, the weighting at the time of interpolation is changed according to whether or not there is a difference in sensitivity. This enables natural processing to be carried out with a simple processing circuit so that the image quality does not differ notably between portions determined to have a difference in sensitivity and portions determined not to have a difference in sensitivity.

At this time, processing is carried out so that the weightings of pixels with different sensitivities become identical to each other, and consequently this can reduce side effects.

In addition, in this interpolation, the value of a missing color component is estimated using information regarding a plurality of color components. At this time, the rate of utilization of information regarding color components including pixels with different sensitivities is reduced. This can prevent a side effect such as the appearance of a grid pattern from easily occurring.

Furthermore, when weighting calculation is carried out based on a difference between pixels of the same color, the influence of the difference between pixels of the same color with different sensitivity, i.e., pixels which are less reliable as data, is moderated during the calculation. This suppresses the occurrence of a resultant side effect.

In addition, although various factors are related to a difference in sensitivity, a difference in sensitivity is likely to occur when a pattern of pixel values in the neighborhood of the pixel of interest satisfies particular conditions. Thus, processing that prevents a side effect from occurring for locally generated differences in sensitivity can be carried out by determining whether or not the relevant neighborhood has such a pattern by using a feature value to judge that the higher probability of the neighborhood having the relevant pattern, the more difference in sensitivity.

At this time, the magnitude of the difference in sensitivity can be determined more reliably by associating a difference in sensitivity occurring in relation to a pixel value pattern in the neighborhood, i.e., the pattern easily causing a difference in sensitivity, with the feature value of the pattern, and by saving the association in a table.

Furthermore, statistics are calculated separately for different locations with the knowledge of the positional relationship of pixels that produce a difference in sensitivity, and the results are compared with one another. Because of this, a determination can be made reliably as to whether or not there is a difference in sensitivity. In the case of, for example, a Bayer array, a sensitivity difference which may occur in G between lines due to the leakage of electric charge from the adjacent R and B can be detected.

Furthermore, when results with a reduced number of pixels are to be recorded, the processing is made more efficient because the processing of determining the difference in sensitivity is skipped based on the fact that a side effect finally caused by a difference in sensitivity is not noticeable.

Embodiment 3

Figure 13:
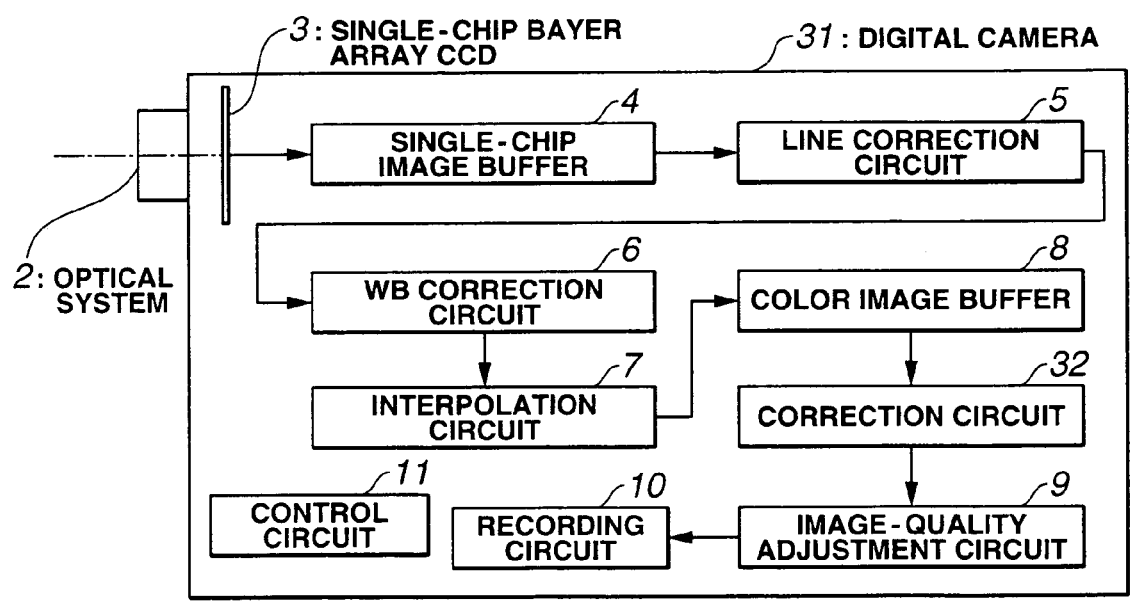
FIG. 13 is a block diagram showing the structure of a digital camera according to Embodiment 3 of the present invention.
Figure 14:
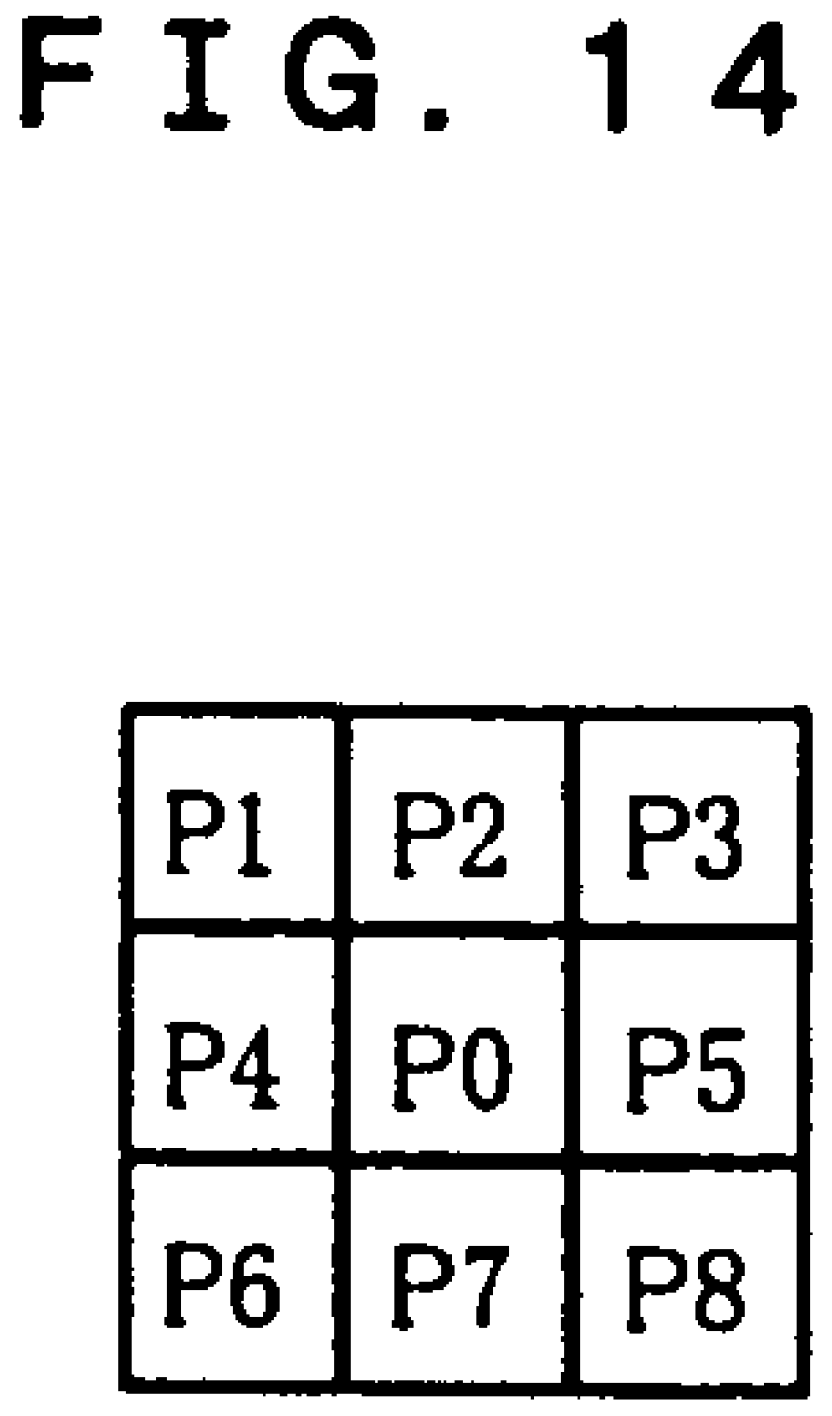
Figure 15:
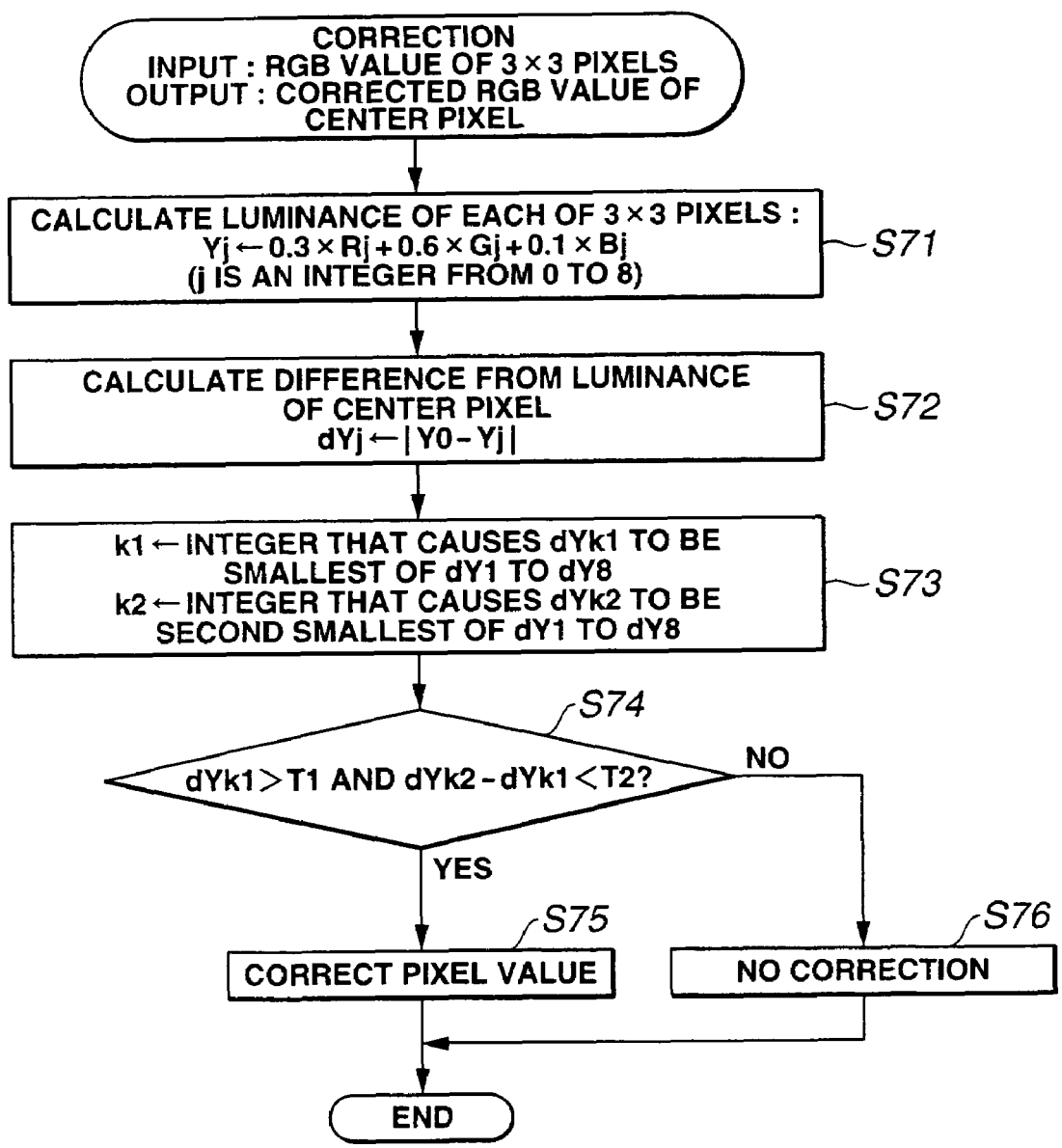
FIG. 15 is a flowchart showing processing by the correction circuit according to Embodiment 3.
Figure 16:
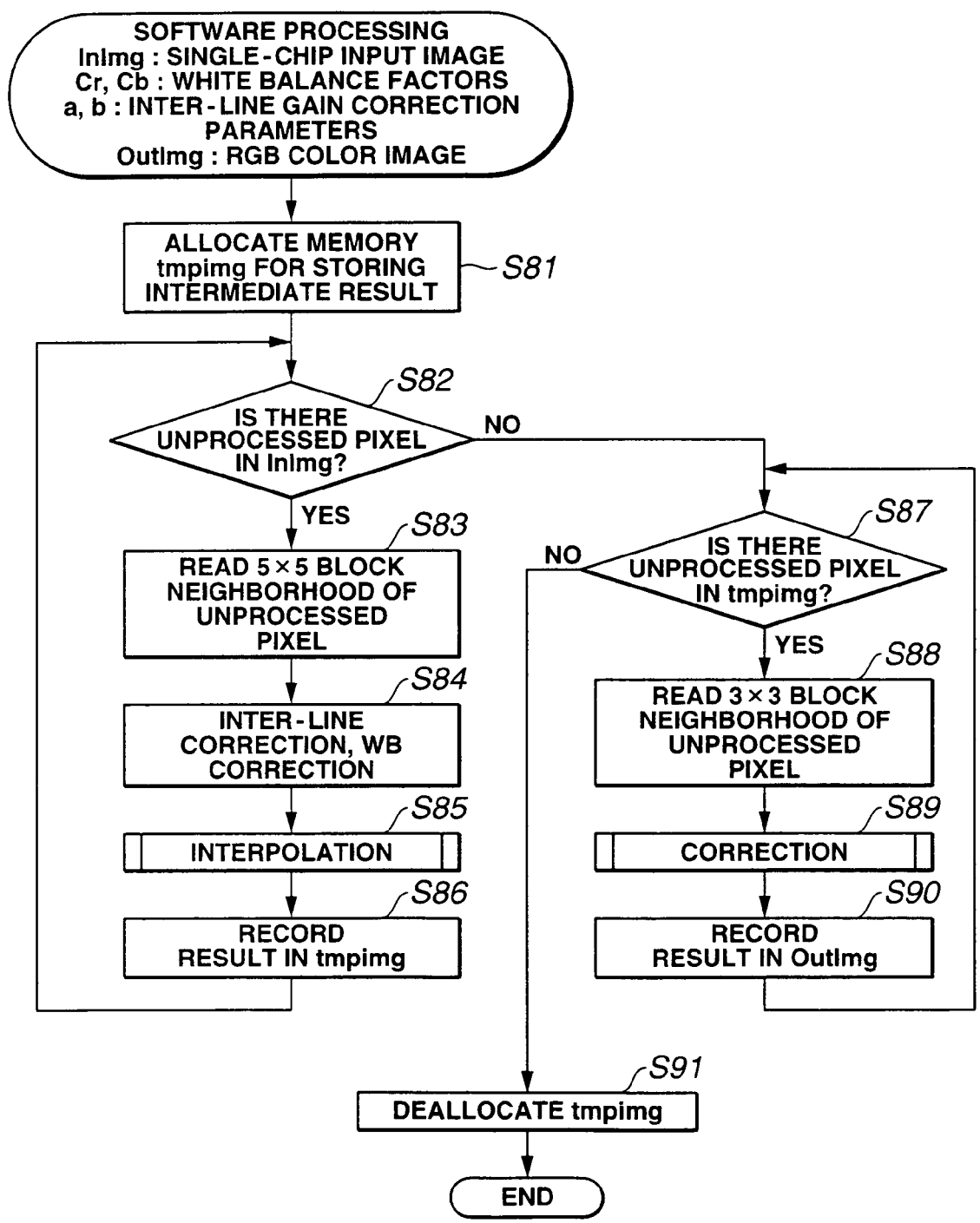
FIG. 16 is a flowchart showing the software processing carried out by the computer according to Embodiment 3.

FIGS. 13 to 16 show Embodiment 3 according to the present invention. FIG. 13 is a block diagram showing the structure of a digital camera, FIG. 14 is a diagram showing the numbers of pixels used for processing by the correction circuit, FIG. 15 is a flowchart showing processing by the correction circuit, FIG. 16 is a flowchart showing the software processing carried out by the computer.

In this Embodiment 3, the same components as those in the above-described Embodiments 1 and 2 are represented by the same reference numerals, and will not be described. The following description mainly focuses on the differences.

In this Embodiment 3, an image processing apparatus according to the present invention is applied to a digital camera as with Embodiment 1.

A digital camera 31 according to this Embodiment 3 is additionally provided with a correction circuit 32 as post-interpolation correcting means between the color image buffer 8 and the image-quality adjustment circuit 9, compared with the digital camera 1 according to Embodiment 1.

The operation of the digital camera 31 will now be described with emphasis centered mainly on the differences from Embodiment 1.

When a shutter button is pressed by a user, in the same manner as in the Embodiment 1, an optical image via the optical system 2 is captured by the single-chip Bayer array CCD 3, and a single-chip image with only one color component type per pixel is stored in the single-chip image buffer 4.

Then, the line correction circuit 5 and the WB correction circuit 6 operate in the same manner as in the Embodiment 1. That is, the white balance factors Crg and Cbg are calculated and stored while sensitivity correction is carried out between lines.

Subsequently, the interpolation circuit 7 carries out interpolation of each pixel in the single-chip image buffer 4. This is also carried out in the same manner as in Embodiment 1, that is, color images in which missing color components are compensated for at each pixel are obtained in the color image buffer 8.

Thereafter, the correction circuit 32 carries out processing. The correction circuit 32 sequentially scans each pixel in the color image buffer 8, reads out a neighborhood of 3×3 pixels with respect to each pixel, and carries out processing as shown in FIG. 15 to output the correction RGB value of the center pixel to the image-quality adjustment circuit 9.

Each step of the flowchart shown in FIG. 15 will now be described.

When processing starts, a luminance value Y is calculated from the RGB component for each pixel in the neighborhood of 3×3 pixels (step S71). In the calculation of this luminance value, the following standard definition is used.

$$Yj=0.3 \times Rj+0.6 \times Gj+0.1 \times Bj$$

Here, each pixel is assigned a number as shown in FIG. 14. Hereinafter, the value of each pixel is represented-using a numerical subscript, for example, j=0 to 8.

Then, the difference in luminance between the center pixel and its neighborhood pixels (this indicates a correlation between the pixel values of the pixel of interest and the pixel values of the neighborhood pixels) is calculated as described below (step S72).

$$dYj=|Y0-Yj|,$$

where j is an integer from one to eight.

Then, a search is made for integers k1 and k2 that satisfy conditions (1) and (2) shown below (step S73).

(1) dYk1 is the smallest of dY0 to dY8.
(2) dYk2 is the second smallest of dY0 to dY8.

Then, a check is carried out as to whether or not dYk1 is greater than T1 and dYk2−dYk1 is smaller than T2, where T1 and T2 are predetermined thresholds (step S74). If this condition is satisfied, it indicates that the center pixel is recognized as an isolated point with a higher probability.

Here, if the condition is satisfied and the center pixel is determined to be an isolated point, correction values (R0', G0', B0') for the center pixel are calculated using Expression 14, and these calculation results are output, and the processing ends (step S75).

$$R0'=(Rk1+Rk2)/2 \quad \text{[Expression 14]}$$

$$G0'=(Gk1+Gk2)/2$$

$$B0'=(Bk1+Bk2)/2$$

On the other hand, if the condition is not satisfied in the step S74, the RGB pixel value of the center pixel is output without correction, and the processing ends (step S76).

The corrected RGB value thus output to the image-quality adjustment circuit 9 is adjusted by the image-quality adjustment circuit 9 and is recorded by the recording circuit 10 in the same manner as with the Embodiment 1, and then all processing ends.

In the above description, processing is carried out with hardware (e.g., circuits) in the digital camera 31, as an image processing apparatus, but this kind of processing can also be carried out with an image-processing program on a computer such as a PC (personal computer).

In the same manner as described with reference to FIGS. 10 to 12 in the Embodiment 2, this software processing processes images stored in the memory InImg, i.e., images which have only just been obtained by the single-chip Bayer array CCD 3 and have only one color component type at each pixel, and then outputs three-color images to the memory OutImg. It is noted that the white balance factors Cr and Cb and the inter-line gain correction factors a and b are given as parameters.

Each step of the flowchart shown in FIG. 16 will now be described. FIG. 16 shows the flow of software processing.

When this processing starts, the memory tmpimg for storing an intermediate result of interpolation is allocated (step S81).

Then, a determination is made as to whether or not unprocessed pixels exist in the memory InImg (step S82).

Here, if unprocessed pixels exist, one of the unprocessed pixels is set as a pixel to be processed, and the block of 5×5 pixels neighborhood of this pixel to be processed is read out from the memory InImg (step S83).

Then, inter-line correction is carried out by applying the calculation based on Expression 8 to the pixels in the block read out from the memory InImg, and WB correction is carried out by executing the calculation based on Expression 9 (step S84).

Subsequently, interpolation is carried out by a known method to generate three RGB color components at each pixel (step S85).

Thereafter, the result of interpolation is recorded at the corresponding pixel location in tmpimg (step S86), and the flow returns to the step S82 for processing of another pixel.

On the other hand, if unprocessed pixels do not exist in the memory InImg in the step S82, a further determination is made as to whether or not there are pixels that have not been subjected to pixel correction processing in the memory tmpimg (step S87).

Here, if there is a pixel that has not been subjected to correction processing, data in the 3×3 pixels neighborhood of this uncorrected pixel is read out from the memory tmpimg (step S88), correction processing as shown in FIG. 15 is carried out (step S89), the result of this correction processing is recorded at the corresponding pixel location in the memory OutImg (step S90), and the flow returns to the step S87 for processing a subsequent unprocessed pixel.

Furthermore, if a pixel that has not been subjected to correction processing does not exist in the memory tmpimg in the step S87, the memory area allocated as tmpimg is deallocated (step S91), and the processing ends.

It is noted that some modifications of this embodiment are conceivable. One preferable modification is realized by providing the interpolation circuit 7 with a function for generating images with fewer pixels than images preserved in the single-chip image buffer 4, where processing of the correction circuit 32 is skipped when this function is performed. A mode of outputting with fewer pixels is normally provided in digital cameras. In this case, the interpolation circuit 7 carries out processing by reducing the number of pixels of an image while reading the image from the single-chip image buffer 4. Thus, because a difference in sensitivity of G pixels, if any, gives a smaller impact on the processing result, the processing efficiency can be improved and the power consumption can be reduced without degrading the image quality by aborting the processing by the correction circuit 32 depending on the pixel-skipping rate (i.e., if the reduction ratio is a predetermined threshold or smaller).

In addition, although this embodiment has been described by way of an example of a single-chip image pickup system, the same processing can be applied to a two-chip image pickup system or a three-chip pixel-shifting image pickup system after a color image has been acquired with interpolation according to the respective method.

According to this Embodiment 3, substantially the same advantage as with the above-described Embodiments 1 and 2 can be offered, and a side effect that may occur due to a difference in sensitivity between pixels is prevented not by changing interpolation according to a difference in sensitivity but by directly correcting the side-effect pattern that is likely to occur after interpolation. This enables the image quality to be improved more easily.

Furthermore, whether or not the neighborhood pixels are similar to the pixel of interest is checked by correlation so that the pixel values of the highly similar neighborhood pixels are mixed with the pixel value of the pixel of interest. This advantageously reduces the side effects.

Furthermore, when results are to be recorded by reducing the number of pixels, the processing is made more efficient, because post-interpolation correction is skipped based on the fact that the side effect finally caused by a difference in sensitivity is not noticeable.

Embodiment 4

Figure 17:
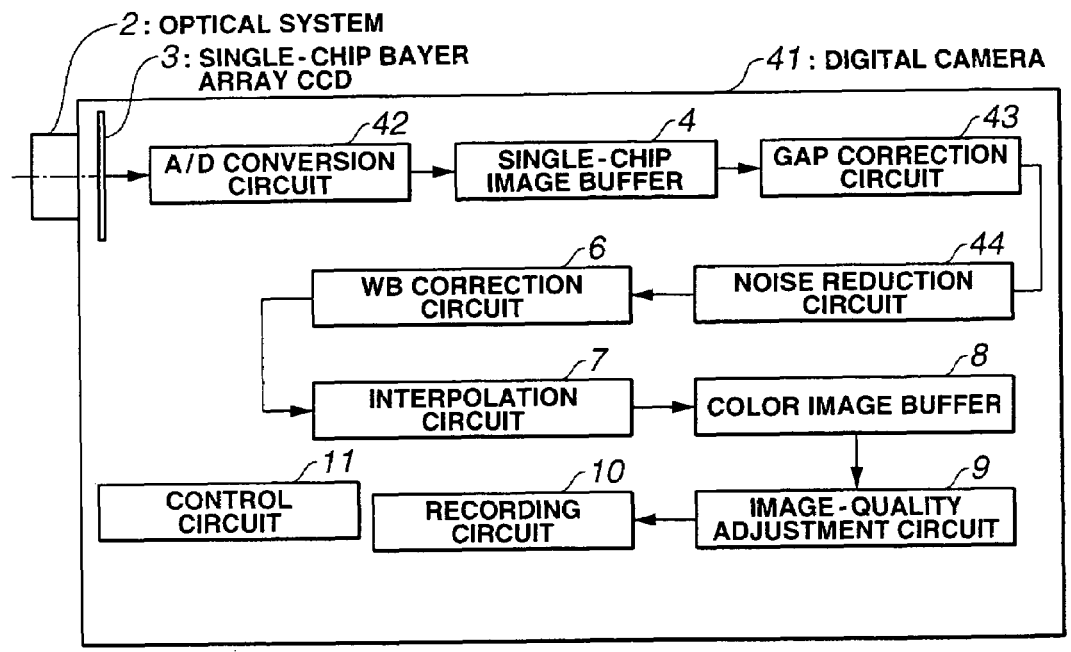
FIG. 17 is a block diagram showing the structure of a digital camera according to Embodiment 4 of the present invention.
Figure 18:
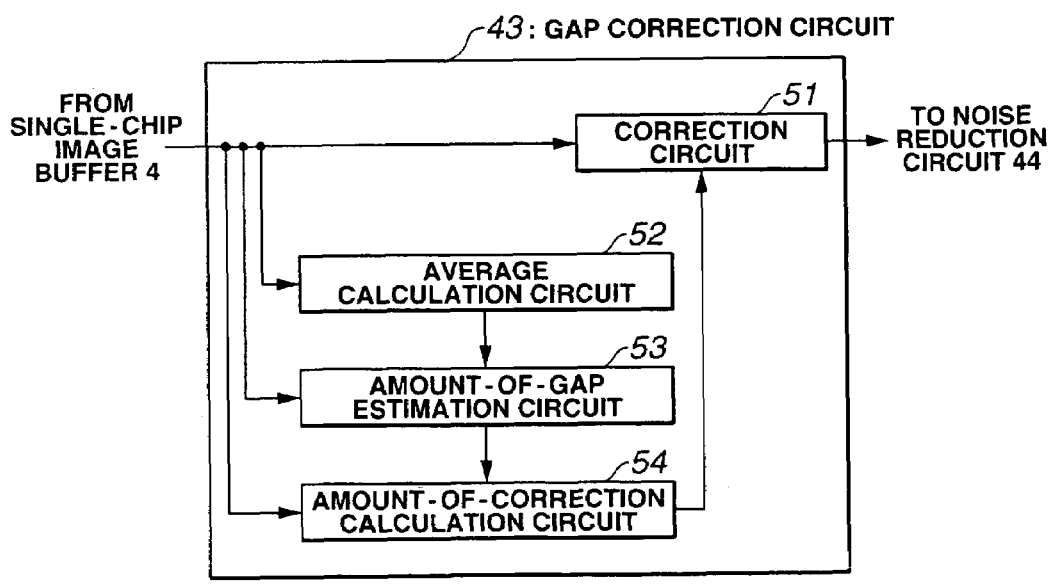
FIG. 18 is a block diagram showing one exemplary structure of a gap correction circuit according to Embodiment 4.
Figure 20:
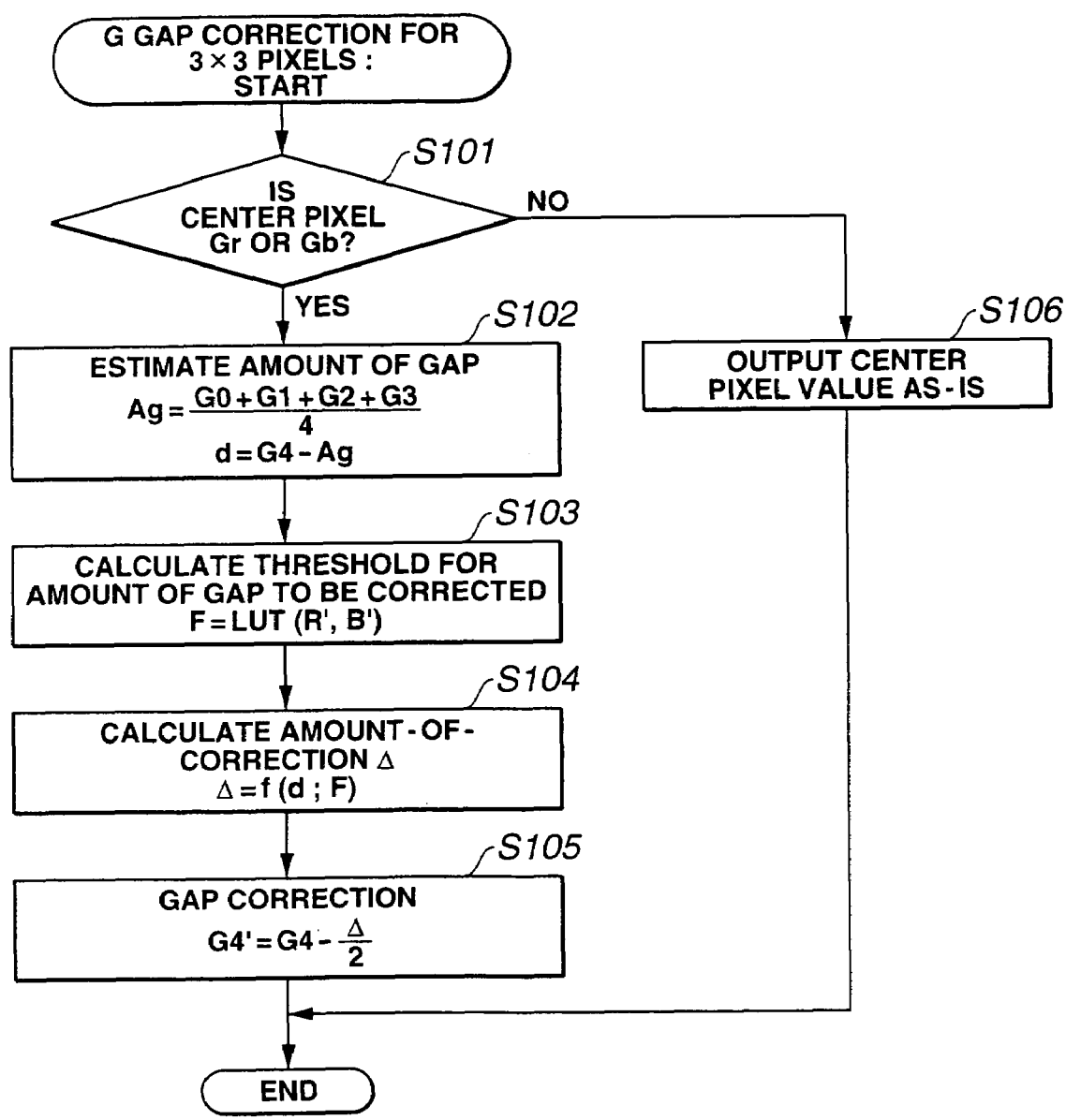
FIG. 20 is a flowchart showing processing by the gap correction circuit according to Embodiment 4.
Figures 21, 22:
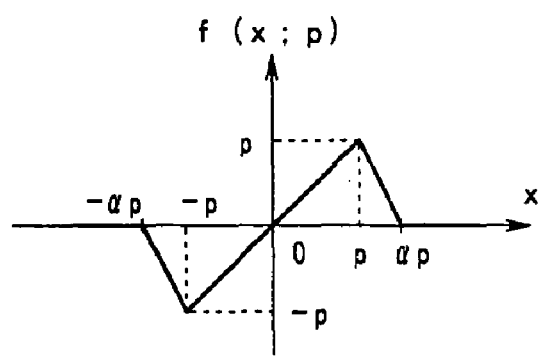
FIG. 21 is a diagram showing an example of a neighborhood for processing by the gap correction circuit according to Embodiment 4.
FIG. 22 is a line drawing showing an example of a function for obtaining the amount of correction Δ according to Embodiment 4.
Figure 23:
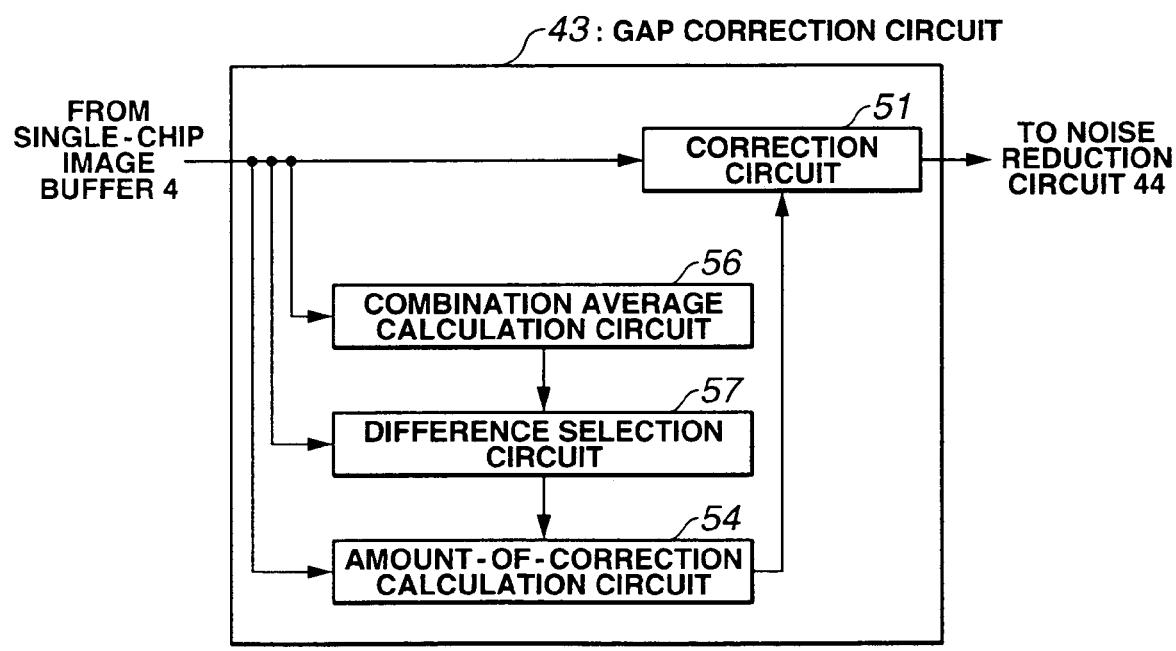
FIG. 23 is a block diagram showing another exemplary structure of the gap correction circuit according to Embodiment 4.
Figure 25:
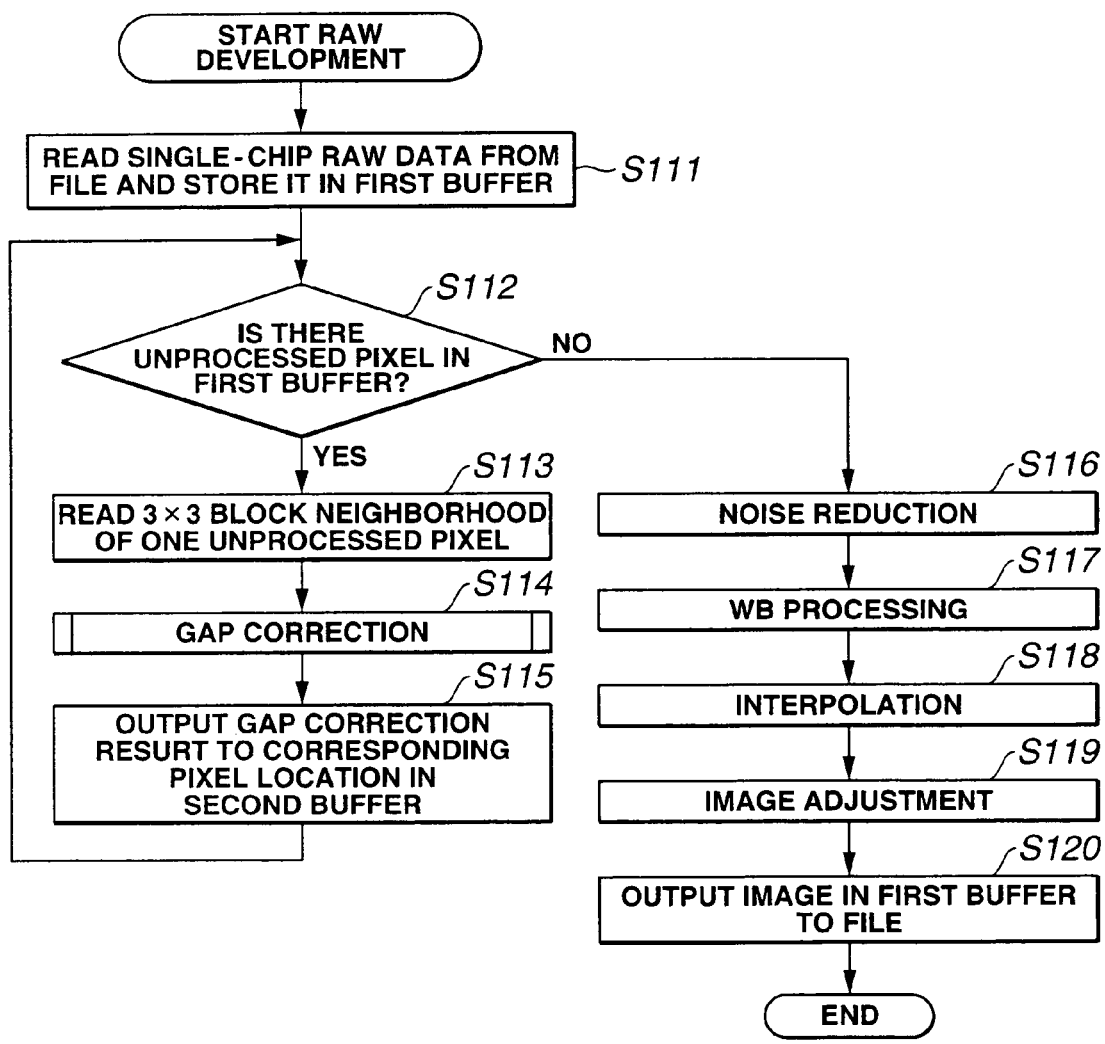
FIG. 25 is a flowchart showing the software processing carried out by a computer according to Embodiment 4.

FIGS. 17 to 25 show Embodiment 4 according to the present invention. FIG. 17 is a block diagram showing the structure of a digital camera, FIG. 18 is a block diagram showing one exemplary structure of a gap correction circuit, FIGS. 19A and 19B are illustrations of a G gap, FIG. 20 is a flowchart showing processing by the gap correction circuit, FIG. 21 is a diagram showing an example of a neighborhood for processing by the gap correction circuit, FIG. 22 is a line drawing showing an example of a function for obtaining the amount of correction Δ, FIG. 23 is a block diagram showing another exemplary structure of the gap correction circuit, FIG. 24 is an illustration for a combination average calculated by a combination average calculation circuit, and FIG. 25 is a flowchart showing the software processing carried out by a computer.

In this Embodiment 4, the same components as those in the above-described Embodiments 1 to 3 are represented by the same reference numerals, and will not be described. The following description mainly focuses on the differences.

In this Embodiment 4, an image processing apparatus is applied to a digital camera, as in Embodiment 1 described above.

As shown in FIG. 17, a digital camera 41 according to this Embodiment 4 is provided with a gap correction circuit 43 and a noise reduction circuit 44 in place of the line correction circuit 5 in the digital camera 1 according to Embodiment 1. Furthermore, an A/D conversion circuit 42 for applying gain adjustment to an analog video signal output from the single-chip Bayer array CCD 3 and then converting it to a digital video signal is explicitly provided between the single-chip Bayer array CCD 3 and the single-chip image buffer 4. This A/D conversion circuit is also provided but is not shown in the digital cameras according to the above-described Embodiments 1 to 3. Then, the A/D conversion circuit 42, the gap correction circuit 43, and the noise reduction circuit 44 are controlled by the control circuit 11.

The gap correction circuit 43 carries out correction of the sensitivity difference of the G component for images stored in the single-chip image buffer 4.

The noise reduction circuit 44 carries out noise reduction of a signal output from the gap correction circuit 43.

As shown in FIG. 18 in more detail, the gap correction circuit 43 includes a correction circuit 51, an average calculation circuit 52, an amount-of-gap estimation circuit 53, and an amount-of-correction calculation circuit 54.

The average calculation circuit 52 reads out image data in blocks of a predetermined size from the single-chip image buffer 4, and calculates the mean value of the G component other than the pixel of interest.

The amount-of-gap estimation circuit 53 estimates the amount of sensitivity difference by calculating the difference between the mean value calculated by the average calculation circuit 52 and the G component value of the pixel of interest.

The amount-of-correction calculation circuit 54 calculates the feature value of the image data read out in blocks from the single-chip image buffer 4, obtains a threshold based on the relevant feature value, and calculates the amount of correction of the sensitivity difference of the image data read out in blocks from the single-chip image buffer 4 based on this threshold and the amount of sensitivity difference of the G component estimated by the amount-of-gap estimation circuit 53.

The correction circuit 51 carries out correction of the sensitivity difference of the G component value of the pixel of interest based on the amount of correction of the sensitivity difference calculated by the amount-of-correction calculation circuit 54, and output the result to the noise reduction circuit 44.

The operation of the digital camera 41 described above will now be described, with the focus placed on the differences from the above-described Embodiments.

The gap correction circuit 43 reads out a block area of size 3×3 pixels neighborhood of each pixel in the single-chip image buffer 4. Then, the pixel located at the center of the block area of size 3×3 is set as the pixel of interest. The relevant gap correction circuit 43 carries out correction processing as shown below, only if the color component of the pixel of interest is the G component.

Here, a G gap will now be described with reference to FIGS. 19A and 19B. The single-chip Bayer array CCD 3 has a color filter array as shown in FIG. 19A. Because of the characteristics of the sensor, a difference in sensitivity may occur between G pixels on the odd-numbered lines (denoted as Gr) and G pixels on the even-numbered lines (denoted as Gb) in the figure under particular photographing conditions, even though the sensor is for acquiring the same G component. More specifically, for example, even if a flat object that will produce an output value of "128" at all pixels is captured, as shown in FIG. 19B, a pixel value of "180" is obtained from Gr and a pixel value of "100" is obtained from Gb, thus generating a difference in pixel value between Gr and Gb. Hereinafter, this difference is referred to as a G gap.

The gap correction circuit 43 corrects this G gap to output corrected pixel values according to the flow shown in FIG. 20.

More specifically, when the gap correction circuit 43 starts the processing shown in FIG. 20, it is first determined whether the center pixel of the readout neighborhood blocks is one of Gr and Gb (step S101).

Here, if the center pixel is Gr or Gb, the average calculation circuit 52, as shown in Expression 15, calculates the mean value Ag (feature value) of G pixels G0 to G3 located at the four corners of the pixel array shown in FIG. 21, and outputs it to the amount-of-gap estimation circuit 53.

$$Ag=(G0+G1+G2+G3)/4 \quad \text{[Expression 15]}$$

The amount-of-gap estimation circuit 53 calculates the difference between the mean value Ag calculated by the average calculation circuit 52 and the value of the center pixel G4 in the neighborhood block based on Expression 16 as the amount d of a gap, which is the amount of sensitivity difference, and outputs the calculated amount d of the gap to the amount-of-correction calculation circuit 54 (step S102).

$$d=Ag-G4 \quad \text{[Expression 16]}$$

The amount-of-correction calculation circuit 54 calculates the mean value R' (feature value) of the R pixels and the mean value B' (feature value) of the B pixels included in the neighborhood block. With these mean values R' and B' as indices, the amount-of-correction calculation circuit 54 then obtains a threshold F (amount of sensitivity difference) for the amount of correction for appropriate gap correction by referring to a prediction table (lookup table: LUT) stored in an internal ROM of the relevant amount-of-correction calculation circuit 54 (step S103). The prediction table is produced by modeling the relationship between the upper limit value of the amount of gap between the Gr pixels and the Gb pixels and the surrounding R pixel values and B pixel values, based on the images of various objects under various lighting conditions.

Then, the amount-of-correction calculation circuit 54 calculates an appropriate amount of correction Δ(amount of correction of sensitivity difference) for actually correcting the G gap based on the threshold F for the amount of correction calculated as described above and the amount d of gap estimated by the amount-of-gap estimation circuit 53 (step S104). This calculation is also carried out by referring to the table stored in the internal ROM of the relevant amount-of-correction calculation circuit 54. The table stored in this internal ROM is produced by applying discrete approximation to, for example, a function f (predetermined function) as shown in FIG. 22. This function f(x;p) has a parameter of p and an independent variable of x, and gives f(x;p)=x when |x| is p or smaller or zero when |x| is αp (threshold) or greater. When |x| is greater than p and smaller than αp (threshold), this function has a shape that connects them continuously (connecting them with, for example, a straight line). Here, |x| represents the absolute value of x and α is a predetermined constant equal to or greater than one. The amount-of-correction calculation circuit 54 refers to a table corresponding to such a function f by using x=d and p=F to obtain the amount of correction Δ substantially as Δ=f(d;F), and outputs the obtained amount of correction Δ to the correction circuit 51.

Subsequently, based on Expression 17, the correction circuit 51 subtracts half the amount of correction Δ obtained by the amount-of-correction calculation circuit 54 from the center pixel value G4 to calculate the final gap correction value G4'.

$$G4'=G4-\Delta/2 \quad \text{[Expression 17]}$$

Thereafter, this value G4' is output to the noise reduction circuit 44 as the center pixel value (step S105).

If the object is flat, i.e., the neighborhood pixels G0 to G3 in the block shown in FIG. 21 have the same value V1, and the center pixel G4 has a value V2, the amount d of the gap calculated in the step S102 is V2−V1. If the absolute value of this V2−V1 is the threshold F calculated in step S103 or less, the amount of correction Δ calculated in the step S105 is equal to V2−V1. Therefore, the value of G4' calculated in step S105 is V2−(V2−V1)/2=(V1+V2)/2. As described above, the G-gap correction processing according to this Embodiment is characterized in that if the amount of gap is smaller than the threshold F, correction is carried out such that the correction result is close to the mean value between the pixel value of the Gr pixel and the pixel value of the Gb pixel.

Furthermore, if a determination is made in the step S101 that the center pixel is not Gr or Gb, the pixel value of the center pixel is output as-is to the noise reduction circuit 44 (step S106).

Thus, when processing in the step S105 or step S106 is carried out, processing of this G-gap correction ends.

When processing as described above is carried out by the gap correction circuit 43, the pixel values which have been subjected to G-gap correction for the pixels in the single-chip image buffer 4 are sequentially input to the noise reduction circuit 44. The noise reduction circuit 44 carries out reduction in noise resulting from the characteristics of the single-chip Bayer array CCD 3 and outputs the result to the WB correction circuit 6.

The subsequent processing is the same as in the Embodiment 1.

Many modifications of this embodiment are conceivable. For example, the order of processing by the WB correction circuit 6, the noise reduction circuit 44, and the gap correction circuit 43 is not limited as described above but can be changed freely.

Furthermore, one modification for simplifying the circuits may be realized such that a fixed value is used for the threshold F for the processing in step S103 by the gap correction circuit 43, instead of predicting the threshold F based on the feature value of the neighborhood pixels for the processing. In this case, a fixed value, instead of a table, is stored in the internal ROM in the amount-of-correction calculation circuit 54. This kind of methods is also acceptable in practice depending on the characteristics of the single-chip Bayer array CCD 3.

Alternatively, the gap correction circuit 43 can be constructed as shown in FIG. 23. In an exemplary structure shown in FIG. 23, the gap correction circuit 43 includes a correction circuit 51, a combination average calculation circuit 56, a difference selection circuit 57, and an amount-of-correction calculation circuit 54. In short, the structure shown in FIG. 23 includes the combination average calculation circuit 56 and the difference selection circuit 57 in place of the average calculation circuit 52 and the gap estimation circuit 53 in the structure shown in FIG. 18.

The combination average calculation circuit 56 includes a selector for selecting a particular combination of pairs of the G pixels included in the 3×3 pixels neighborhood and a circuit for calculating the average of the pairs sequentially selected by this selector. Combination pairs selected by the combination average calculation circuit 56 and their mean values are, for example, A0 to A5 (feature values) as shown in FIG. 24, i.e., A0 to A5 calculated from Expression 18 below.

$$A0=(G0+G1)/2$$ [Expression 18]

$$A1=(G0+G2)/2$$

$$A2=(G1+G3)/2$$

$$A3=(G2+G3)/2$$

$$A4=(G1+G2)/2$$

$$A5=(G0+G3)/2$$

Each of the mean values A0 to A5 calculated in this manner by the combination average calculation circuit 56 is output to the difference selection circuit 57.

The difference selection circuit 57 respectively calculates the differences Di=G4−Ai (i is an integer from zero to five) between each of the mean values A0 to A5 received from the combination average calculation circuit 56 and the center pixel value G4, and, from among these values, outputs the Di which produces the minimum absolute value to the amount-of-correction calculation circuit 54 as the amount equivalent to the amount d of the gap in step S102 in FIG. 20. The subsequent processing by the amount-of-correction calculation circuit 54 and the processing by the correction circuit 51 are the same as described above.

In the above description, processing is carried out with hardware (e.g., circuits) in the digital camera 41, as an image processing apparatus, but this kind of processing can also be carried out with an image-processing program on a computer such as a PC (personal computer).

This software applies a development process to a RAW data file generated by converting an analog output from the single-chip Bayer array CCD 3 to a digital signal.

Each step of the flowchart shown in FIG. 25 will now be described. FIG. 25 shows the flow of software processing.

When this processing is to be carried out, a first buffer and a second buffer need to be allocated in, for example, the memory area of a PC, as working storage areas.

When this processing starts, single-chip image data is read from the RAW data file, and is then stored in the first buffer as a two-dimensional array (step S111).

Then, a determination is made as to whether or not there is an unprocessed pixel in the image data by scanning the first buffer in the line direction and then in the column direction (step S112).

If an unprocessed pixel exists, the 3×3 pixels neighborhood of the selected unprocessed pixel is read out from the first buffer (step S113), and gap correction processing as shown in FIG. 20 is carried out (step S114).

Then, the gap correction result is written to the address corresponding to the unprocessed pixel in the second buffer allocated apart from the first buffer (step S115), and the flow proceeds to the step S112, where a determination is made as to a subsequent unprocessed pixel.

On the other hand, if a determination is made that no unprocessed pixel exists in the first buffer in the step S112, noise reduction is applied to the image in the second buffer, and the processing result is output to the first buffer (step S116).

Next, processing for correcting the white balance (WB) is applied to the image in this first buffer, and the result is output to the first buffer again (step S117).

Furthermore, interpolation of a missing color component is applied to the image in the first buffer, and the result is output to the second buffer (step S118).

Subsequently, image-quality adjustment such as edge enhancement is applied to the image in the second buffer, and the result is output to the first buffer (step S119).

Then, the image in the first buffer is output to the specified file (step S120), and this processing ends.

According to this Embodiment 4, because the sensitivity difference between pixels with the same color component type is corrected before interpolation is applied to missing pixels, substantially as in the above-described Embodiments 1 to 3, interpolation of missing pixels is carried out while the influence of the sensitivity difference is moderated.

Furthermore, the degree of difference in sensitivity between the pixel of interest and pixels with the same color component type as that of the relevant pixel of interest is estimated. This ensures optimal sensitivity correction according to the difference in sensitivity. At this time, the degree of difference in sensitivity is estimated based on the feature value extracted from the data in the neighborhood of the pixel of interest, and hence optimal sensitivity correction can be carried out according to the difference in sensitivity.

In addition, the correspondence between the feature value and the amount of sensitivity difference is pre-checked and stored in a table. This ensures high-speed and high-accuracy sensitivity correction.

Furthermore, a predetermined function is used to calculate the amount of correction of sensitivity difference from the amount of sensitivity difference, and the calculated amount of correction of sensitivity difference is added to the pixel value of the pixel of interest for sensitivity correction. This simplifies the circuit structure and enables sensitivity correction to be carried out without generating significant blurring.

In this case, a function that outputs zero when the absolute value of the amount of sensitivity difference is a certain threshold or greater is used to calculate the amount of correction of sensitivity difference. This enables correction to be cancelled if an estimate indicating a great difference in sensitivity is obtained. This appropriately prevents edges from undergoing blurring, which results if correction is carried out.

Furthermore, a feature value is calculated from the pixel value of a pixel with a color component type different from that of the pixel of interest, and hence differences in sensitivity resulting from a color component other than the color component of interest can also be handled.

Furthermore, feature values are calculated as N mean values of the pixel values of pixels with the same color component type as that of the pixel of interest, and the minimum of the absolute values of the differences in pixel value between the N feature values and the pixel of interest is used as the amount of sensitivity difference. This enables a higher-accuracy sensitivity difference to be estimated.

Embodiment 5

Figure 26:
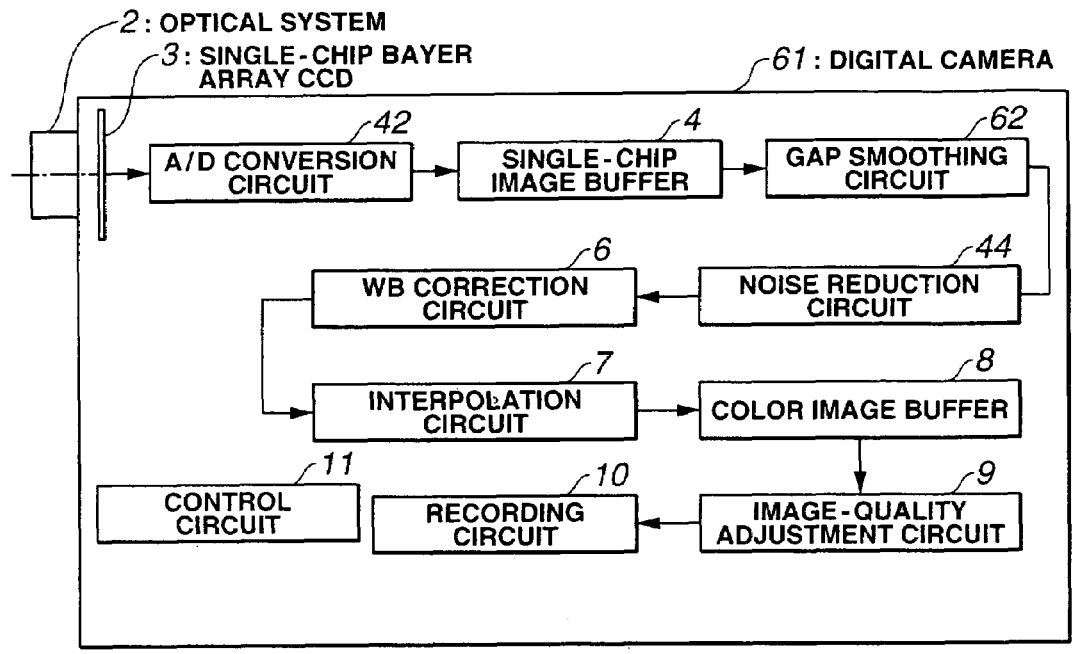
FIG. 26 is a block diagram showing the structure of a digital camera according to Embodiment 5 of the present invention.
Figure 27:
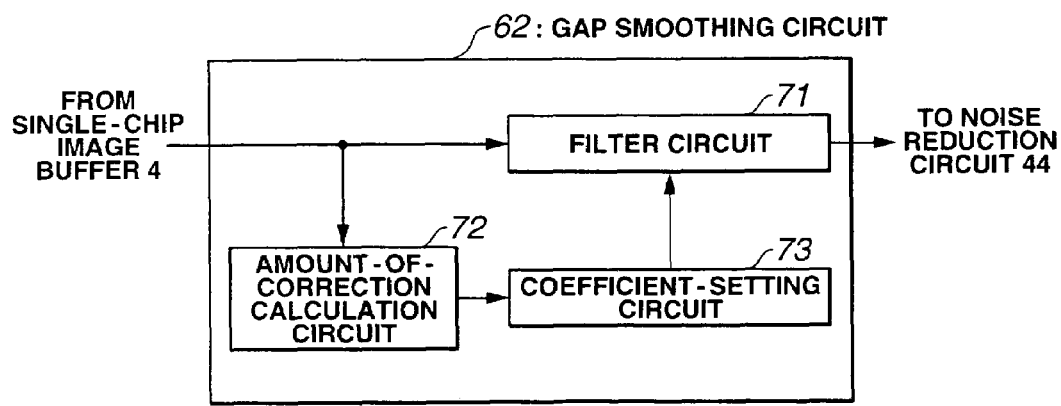
FIG. 27 is a block diagram showing one exemplary structure of a gap smoothing circuit according to Embodiment 5.
Figure 28:
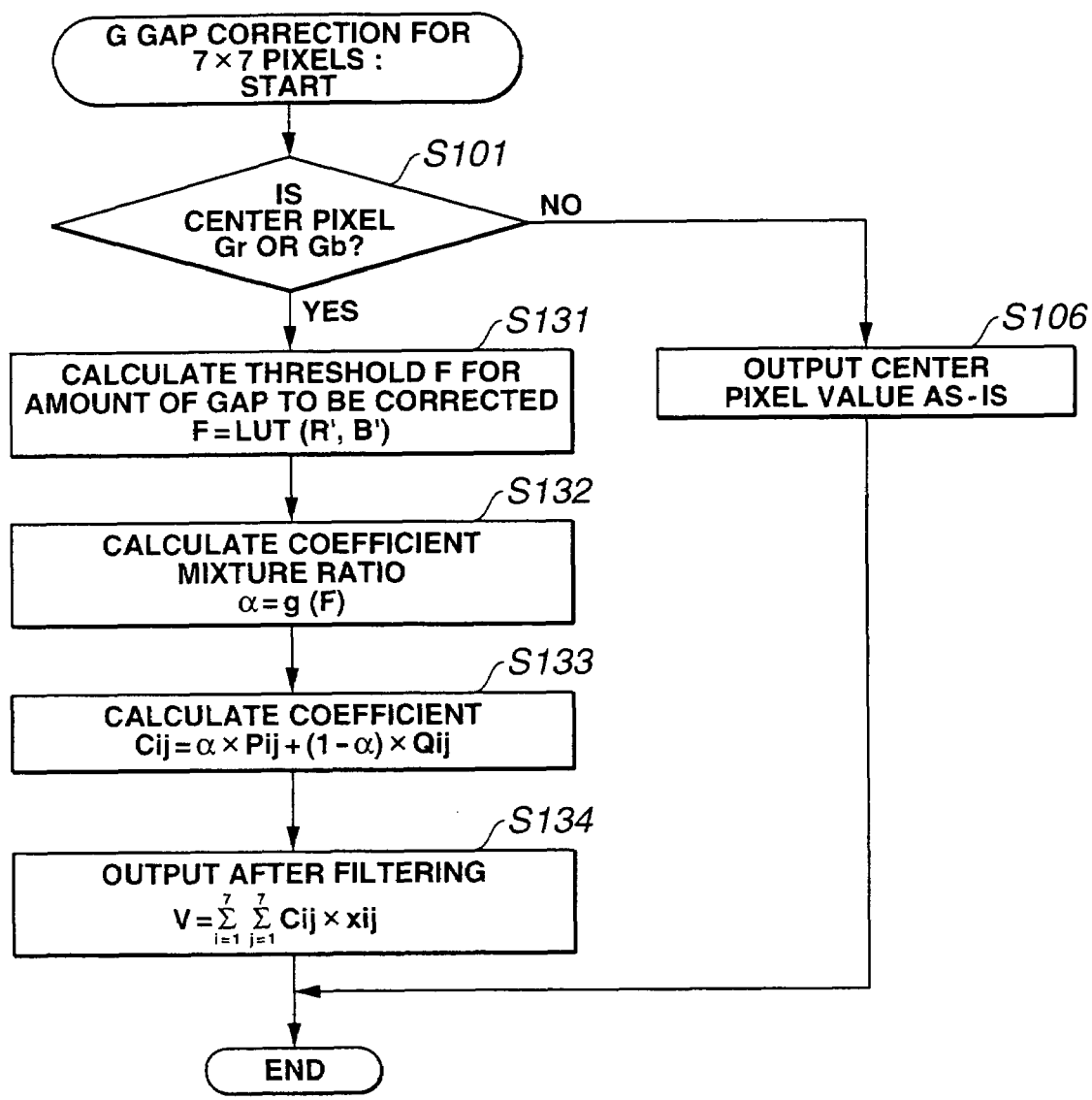
FIG. 28 is a flowchart showing processing by the gap smoothing circuit according to Embodiment 5.
Figure 29:
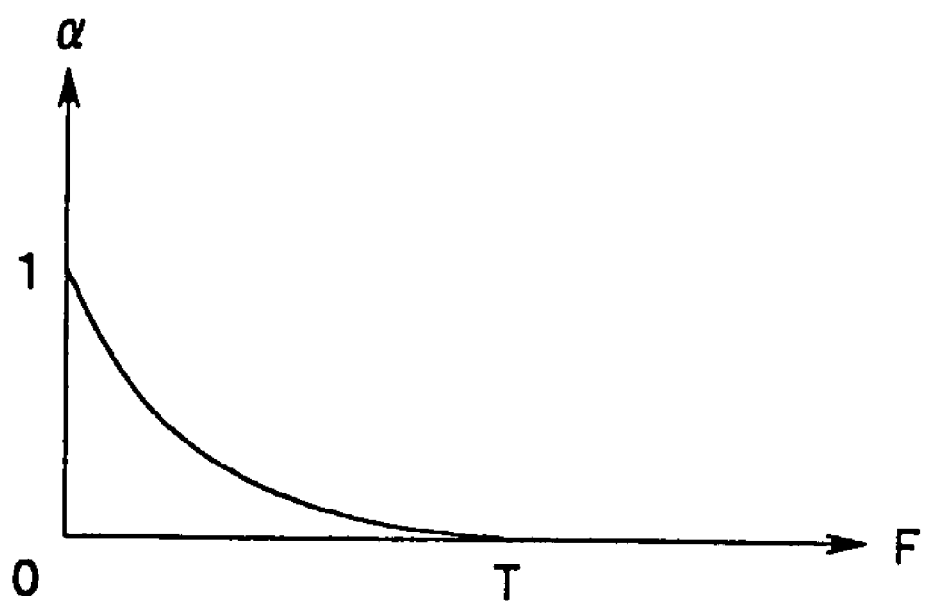
FIG. 29 is a line drawing showing an example of a function for calculating a coefficient mixture ratio a according to Embodiment 5.
Figure 30:
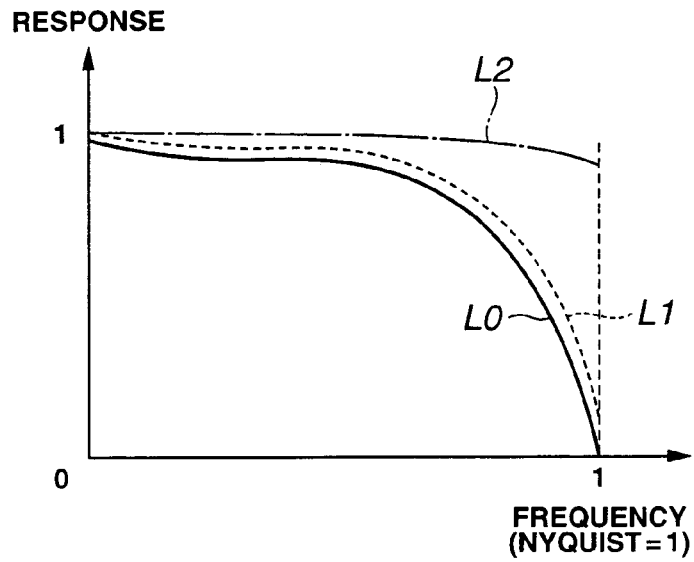
FIG. 30 is an illustration for the frequency characteristics of a filter coefficient set by a coefficient-setting circuit according to Embodiment 5.
Figure 31:
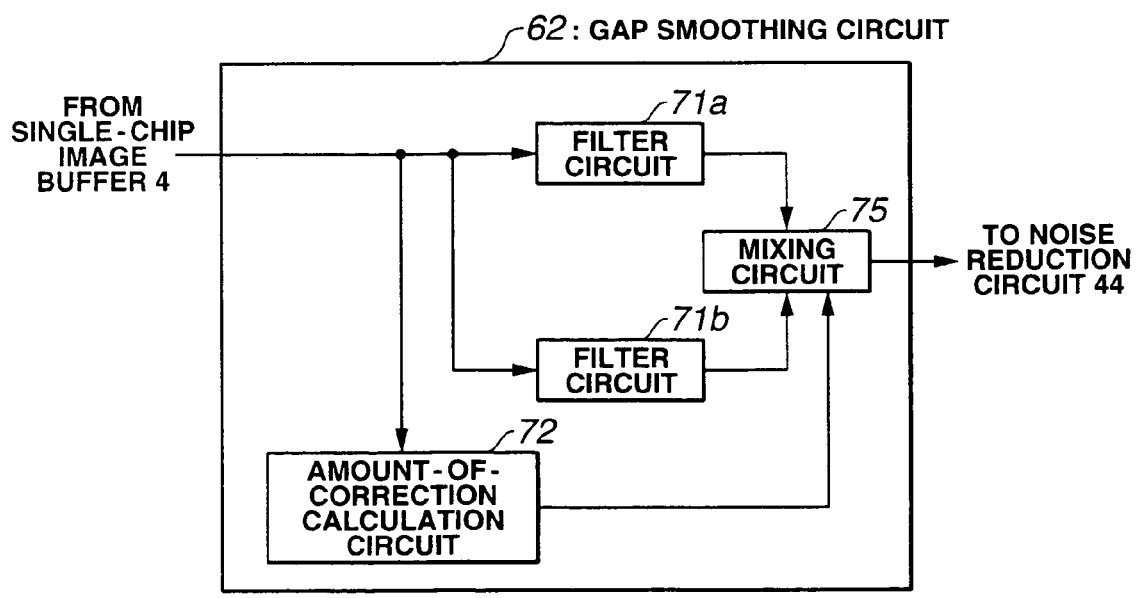
FIG. 31 is a block diagram showing another exemplary structure of the gap smoothing circuit according to Embodiment 5.
Figures 32A, 32B:
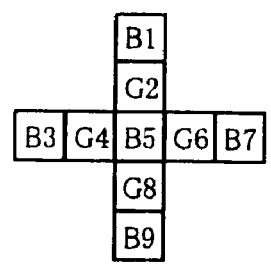
FIGS. 32A and 32B are illustrations for known interpolation based on edge detection.
Figure 33:
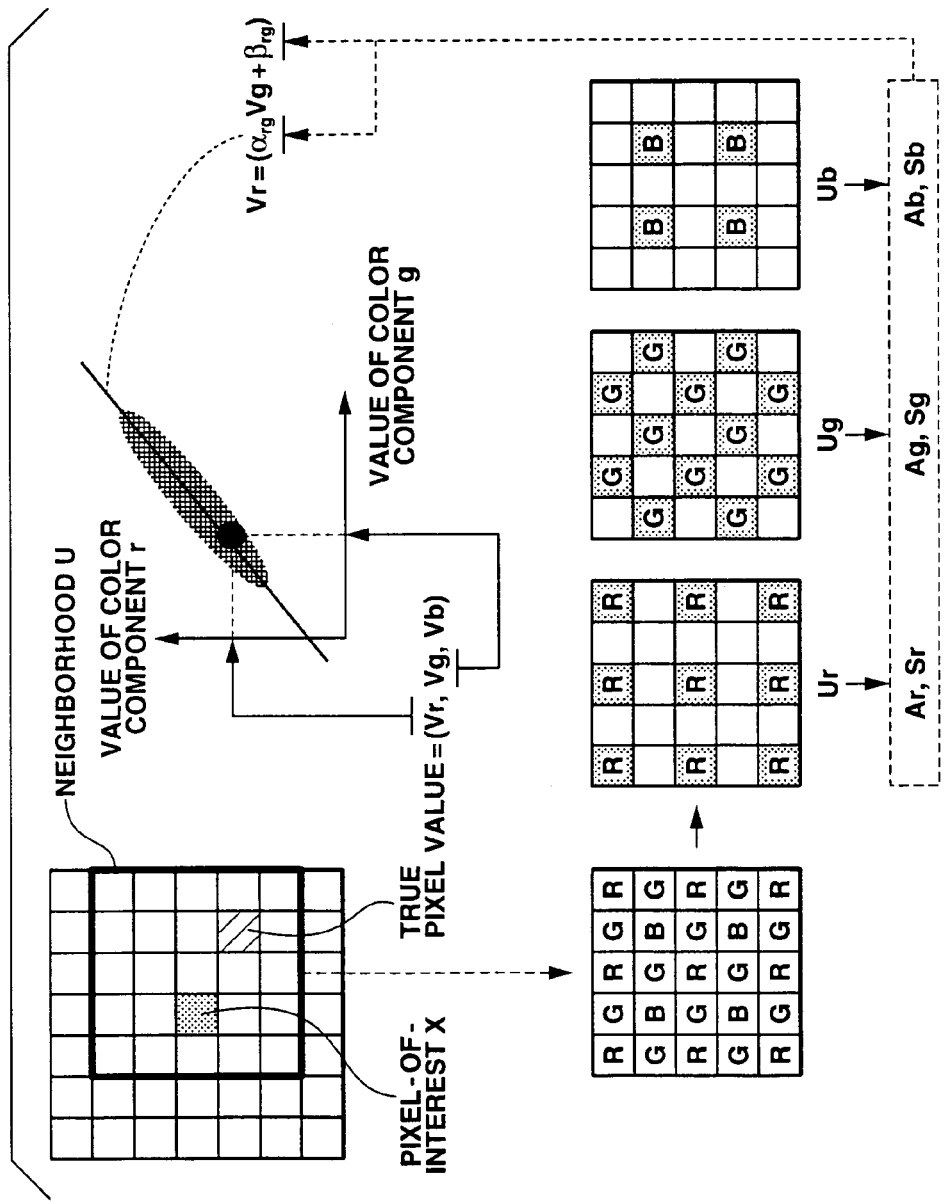
FIG. 33 is an illustration for known interpolation based on color correlation.

FIGS. 26 to 31 show Embodiment 5 according to the present invention. FIG. 26 is a block diagram showing the structure of a digital camera, FIG. 27 is a block diagram showing one exemplary structure of a gap smoothing circuit, FIG. 28 is a flowchart showing processing by the gap smoothing circuit, FIG. 29 is a line drawing showing an example of a function for calculating a coefficient mixture ratio $\alpha$, FIG. 30 is an illustration for the frequency characteristics of a filter coefficient set by a coefficient-setting circuit, and FIG. 31 is a block diagram showing another exemplary structure of the gap smoothing circuit.

In this Embodiment 5, the same components as those in the above-described Embodiments 1 to 4 are represented by the same reference numerals, and will not be described. The following description mainly focuses on the differences.

In this Embodiment 5, an image processing apparatus according to the present invention is applied to a digital camera as with Embodiment 1.

A digital camera 61 according to this Embodiment 5, as shown in FIG. 26, includes a gap smoothing circuit 62 in place of the gap correction circuit 43 in the digital camera 41 according to the Embodiment 4. Then, the gap smoothing circuit 62 is controlled by the control circuit 11.

The gap smoothing circuit 62, as shown in FIG. 27 in more detail, includes a filter circuit 71, an amount-of-correction calculation circuit 72, and a coefficient-setting circuit 73.

The amount-of-correction calculation circuit 72 calculates the mean value R' (feature value) of the R pixels and the mean value B' (feature value) of the B pixels in the 3×3 pixels at the center of the image data read out in blocks of size 7×7 pixels from the single-chip image buffer 4. Furthermore, a threshold F (amount of sensitivity difference) for an appropriate amount of correction for gaps is obtained from these feature values with reference to the table stored in an internal ROM of the relevant amount-of-correction calculation circuit 72 to calculate a coefficient mixture ratio a as a function of this threshold F.

The coefficient-setting circuit 73 calculates a filter coefficient used for calculation by the filter circuit 71 based on the coefficient mixture ratio $\alpha$ calculated by the amount-of-correction calculation circuit 72.

The filter circuit 71 uses the filter coefficient calculated by the coefficient-setting circuit 73 to carry out predetermined arithmetic operations of image data read from the single-chip image buffer 4 for smoothing of the G gap.

The processing performed by the gap smoothing circuit 62 will now be described with reference to FIG. 28. In FIG. 28, the components that carry out the same processing as that in FIG. 20 of the Embodiment 4 are represented by the same reference numerals. Furthermore, as described above, the gap smoothing circuit 62 reads out 7×7 pixels neighborhood of each of the pixels in the single-chip image buffer 4 to carry out the processing described below.

When this processing starts, the processing in the step S101 is carried out to check whether the center pixel is one of Gr and Gb.

Here, if the center pixel is Gr or Gb, the amount-of-correction calculation circuit 72 calculates the mean value R' of the R pixels and the mean value B' of the B pixels included in the block of 3×3 pixels which is at the center of the neighborhood block. With these calculated mean values R' and B' as indices, the amount-of-correction calculation circuit 72 then obtains a threshold F for an appropriate amount of correction for the gap with reference to the prediction table stored in the internal ROM (step S131). This prediction table is the same as the prediction table described in step S103 of FIG. 20 according to the Embodiment 4.

Next, the amount-of-correction calculation circuit 72 calculates the coefficient mixture ratio $\alpha$ for determining a filter to be applied in the downstream filter circuit 71 as a function of the threshold F for the amount of correction for the gap (step S132). One example of a preferable function is shown in FIG. 29, where the function outputs a=1 when F is zero and $\alpha$=0 when F is a certain value T or greater. The meaning of the coefficient mixture ratio will be described below.

Subsequently, the coefficient-setting circuit 73 calculates a filter coefficient used for the calculation by the filter circuit 71, based on the coefficient mixture ratio $\alpha$ calculated by the amount-of-correction calculation circuit 72. More specifically, the filter circuit 71 sets zero to data at the locations without the G component in a block of 7×7 pixels, in which processed pixel in located at the center, read out from the single-chip image buffer 4 and carries out linear filtering. As the filter coefficient at this time, the value output from the relevant coefficient-setting circuit 73 is used.

The coefficient-setting circuit 73 preserves in advance two types of 7×7 filter coefficients in order to set a filter coefficient used by the filter circuit 71. One of the two types of filter coefficients is a coefficient P_i,j (i and j each an integer from one to seven). In this coefficient P_i,j, only P_4,4, which is the center of the filter, is one and the others are zero. The other of the two types of filter coefficients is a coefficient Q_i,j (i and j are each an integer from one to seven). This coefficient Q_i,j has a sum of 2 and its characteristic in the horizontal or vertical direction is zero at the Nyquist frequency, as shown by the curve L0 indicated by a solid line in FIG. 30.

Therefore, when filtering is applied to the 7×7 pixels neighborhood read out from the single-chip image buffer 4 by using the coefficient P_i,j, the value of the center pixel with no correction is output from the filter circuit 71.

On the other hand, when filtering is applied to the 7×7 pixels neighborhood read out from the single-chip image buffer 4 by using the coefficient Q_i,j, such smoothing is carried out that only the frequency components near the Nyquist frequency are decreased sharply and the other frequency components are not affected greatly. If there is a gap between the Gr pixel and the Gb pixel, the effect appears mainly near the Nyquist frequency. Thus, as a result of filtering, a G component value of the center pixel is obtained where the effect of the gap is eliminated due to smoothing; however, the edge portion does not undergo significant blurring.

The coefficient-setting circuit 73 mixes the coefficient P_i,j and the coefficient Q_i,j described above by using the coefficient mixture ratio $\alpha$ acquired from the amount-of-correction calculation circuit 72 based on Expression 19 to generate a new filter coefficient C_i,j, and outputs it to the filter circuit 71 (step S133).

$$C\_i,j = \alpha \times P\_i,j + (1-\alpha) \times Q\_i,j \qquad \text{[Expression 19]}$$

According to this Expression 19 and the coefficient mixture ratio $\alpha$ as shown in FIG. 29, when a large gap occurs in the neighborhood block, a filter coefficient, such as a curve L1 indicated by dotted lines in FIG. 30, that has characteristics similar to that of the coefficient Q_i,j for eliminating this gap is output to the filter circuit 71. On the other hand, if only a small gap occurs in the neighborhood block, a filter coefficient, such as a curve L2 indicated by dotted-chain lines in FIG. 30, that has characteristics similar to that of the coefficient P_i,j is output to the filter circuit 71. Processing in which band degradation and gap correction are optimally balanced is always ensured by mixing filter coefficients as described above.

As described above, the filter circuit 71 applies linear filtering to the neighborhood block based on the filter coefficient C_i,j output from the coefficient-setting circuit 73. More specifically, the processing described below is carried out. Here, when the coordinates of the upper left corner in the 7×7 pixels neighborhood block is defined as (1,1), X_i,j represents the pixel values at the locations (i,j) (i and j are integer from one to seven). First, pixel values x_i,j at the locations where the G component is not obtained are set to zero. Then, a filtering result v is calculated from Expression 20.

$$V = \sum_{i=1}^{7} \sum_{i=1}^{7} C_{ij} \times x_{ij}$$

The filtering result v calculated by the filter circuit 71 in this manner is output to the noise reduction circuit 44.

Various modifications of this embodiment are also conceivable. For example, instead of mixing coefficients and then carrying out filtering using the mixed coefficient, filtering can be carried out using two types of coefficients separately and then the filtering results can be mixed. FIG. 31 shows an exemplary structure of a circuit for carrying out such processing.

More specifically, the gap smoothing circuit 62 shown in FIG. 31 includes two filter circuits 71a and 71b and a mixing circuit 75 in place of the filter circuit 71 and the coefficient-setting circuit 73 in the gap smoothing circuit 62 shown in FIG. 27. Furthermore, the output of the amount-of-correction calculation circuit 72 is connected to the relevant mixing circuit 75.

The filter circuit 71a carries out filtering with the coefficient P_i,j to output a result V1.

The filter circuit 72a carries out filtering with the coefficient Q_i,j to output a result V2.

The mixing circuit 75 receives a coefficient mixture ratio α from the amount-of-correction calculation circuit 72, uses the output V1 from the filter circuit 71a and the output V2 from the filter circuit 71b to calculate a final result V3 based on Expression 21 shown below, and outputs the calculated result V3 to the noise reduction circuit 44.

V3=α×V1+(1−α)×V2    [Expression 21]

Furthermore, in any of the structures shown in FIGS. 27 and 31, the number of mixed filters is not limited to two but three or more filters may be mixed. In this case, the amount-of-correction calculation circuit 72 calculates a plurality of mixture ratios as a function of the threshold F for the amount of correction for the gap.

Furthermore, as a simple circuit with the structure shown in FIG. 31, a switching circuit may be provided in place of the mixing circuit, so that the outputs of the filter circuit 71a and the filter circuit 71b can be switched depending on the coefficient mixture ratio α.

In addition, as gap correction processing in step S114 of the processing in FIG. 25, the processing shown in FIG. 28 can be carried out, instead of carrying out the processing as shown in FIG. 20, to establish software processing for achieving this embodiment.

According to Embodiment 5 described above, substantially the same advantages as in the Embodiment 4 can be offered. Furthermore, a linear filter is applied to pixels with the same color component type as that of the pixel of interest with a filter coefficient set based on the amount of sensitivity difference. This ensures that the differences in sensitivity can be corrected more reliably than a case where the amount of correction of sensitivity difference is added to the pixel value, even if the difference in sensitivity is estimated incorrectly.

Having described the preferred embodiments of the invention referring to the accompanying drawings, it should be understood that the present invention is not limited to those precise embodiments and various changes and modifications thereof could be made by one skilled in the art without departing from the sprint or scope of the invention as defined in the appended claims.

What is claimed is:

1. An image processing apparatus for processing an image of pixels each missing at least one type of color component, the image being produced by capturing an optical image with one of a single-chip image pickup system, a two-chip image pickup system, and a three-chip pixel-shifting image pickup system, the image processing apparatus comprising:

determining means for determining a degree of sensitivity difference between pixels having a specified type of color component in a predetermined neighborhood of a pixel of interest; and interpolating means for carrying out processing for compensating for the missing color component of the pixel of interest, by changing the processing for compensating for the missing color component according to a result of determination by the determining means.

2. The image processing apparatus according to claim 1, wherein:

the interpolating means selects a reference pixel from among pixels having a color component obtained at the pixel of interest in the predetermined neighborhood, calculates, as a correction value, a pixel value of the color component to be acquired by the pixel of interest when a sensitivity to the color component of the pixel of interest is made equal to a sensitivity to the color component of the reference pixel, and changes a pixel value of the color component of the pixel of interest to the correction value according to the degree of sensitivity difference determined by the determining means.

3. The image processing apparatus according to claim 1, wherein:

the interpolating means includes weighted-averaging means for applying weighted averaging to pixels in the predetermined neighborhood, and the weighted-averaging means calculates a pixel value of the pixel of interest by weighted averaging where a weight is changed according to the result of determination by the determining means.

4. The image processing apparatus according to claim 3, wherein the weighted-averaging means decreases the weight for pixels with a color component type determined by the determining means to have a large sensitivity difference.

5. The image processing apparatus according to claim 3, wherein the weighted-averaging means calculates the weight as a function expression of a difference in pixel value between pixels having a same color component type in the predetermined neighborhood, and, if a determination is made by the determining means that the difference in sensitivity to a particular color component is large, changes the function expression such that an influence of the difference in pixel value of the color component is less significant.

6. The image processing apparatus according to claim 3, wherein the weighted-averaging means is changed such that the weights are close to one another among pixels with a color component type determined to have a sensitivity difference by the determining means.

7. The image processing apparatus according to claim 1, wherein the determining means includes feature-value calculating means for calculating a predetermined feature value from a pixel in the predetermined neighborhood of the pixel of interest, and determines the degree of sensitivity difference based on a degree of the feature value.

8. The image processing apparatus according to claim 7, wherein the determining means further includes a table where a feature value of a specified color component is associated with an amount of sensitivity difference and determines the degree of sensitivity difference from the feature value by referring to the table.

9. The image processing apparatus according to claim 7, wherein the determining means classifies pixels having a specified color component in the predetermined neighborhood by a predetermined method, and calculates the feature value based on a mean value and a variation of pixel values in each of the classifications.

10. The image processing apparatus according to claim 8, wherein the determining means classifies pixels having a specified color component in the predetermined neighborhood by a predetermined method, and calculates the feature value based on a mean value and a variation of pixel values in each of the classifications.

11. The image processing apparatus according to claim 7, wherein the determining means calculates the feature value based on a mean value of pixel values of pixels having a specified color component in the predetermined neighborhood and a mean value of pixel values of pixels having a predetermined color component different from the specified color component.

12. The image processing apparatus according to claim 8, wherein the determining means calculates the feature value based on a mean value of pixel values of pixels having a specified color component in the predetermined neighborhood and a mean value of pixel values of pixels having a predetermined color component different from the specified color component.

13. The image processing apparatus according to claim 1, wherein the interpolating means produces a color image by reducing a size of the image produced by the image pickup system using a predetermined reduction ratio, and, when the interpolating means produces a reduced color image, the determining means skips determination as to the degree of sensitivity difference if the reduction ratio is not more than a predetermined threshold.

14. An image processing apparatus for processing an image of pixels each missing at least one type of color component, the image being produced by capturing an optical image with one of a single-chip image pickup system, a two-chip image pickup system, and a three-chip pixel-shifting image pickup system, the image processing apparatus comprising:
interpolating means for compensating for the missing color component of each pixel; and
post-interpolation correcting means for correcting an interpolation result produced by the interpolating means;
wherein the post-interpolation correcting means calculates correlations between a pixel value of a pixel of interest and pixel values of predetermined neighborhood pixels of the pixel of interest to correct the pixel value of the pixel of interest based on a mean value of neighborhood pixels with high correlations.

15. An image processing apparatus for processing an image of pixels each missing at least one type of color component, the image being produced by capturing an optical image with one of a single-chip image pickup system, a two-chip image pickup system, and a three-chip pixel-shifting image pickup system, the image processing apparatus comprising:
interpolating means for compensating for the missing color component of each pixel; and
post-interpolation correcting means for correcting an interpolation result produced by the interpolating means;
wherein the interpolating means produces a color image by reducing a size of the image produced by the image pickup system using a predetermined reduction ratio, and,
when the interpolating means produces a reduced color image, the post-interpolation correcting means skips correction of the interpolation result if the reduction ratio is not more than a predetermined threshold.

16. A computer-readable medium storing an image processing program for causing a computer to process an image of pixels each missing at least one type of color component, the image being produced by capturing an optical image with one of a single-chip image pickup system, a two-chip image pickup system, and a three-chip pixel-shifting image pickup system, the image processing program controlling the computer to perform functions comprising:
a determining operation of determining a degree of sensitivity difference between pixels having a specified type of color component in a predetermined neighborhood of a pixel of interest; and
an interpolating operation of carrying out processing for compensating for the missing color component of the pixel of interest, by changing the processing for compensating for the missing color component according to a result of determination in the determining operation.

17. An image processing apparatus for processing an image of pixels each missing at least one type of color component, the image being produced by capturing an optical image with one of a single-chip image pickup system, a two-chip image pickup system, and a three-chip pixel-shifting image pickup system, the image processing apparatus comprising:
sensitivity correcting means for correcting a difference in sensitivity between pixels having same color components; and
interpolating means for compensating the image corrected by the sensitivity correcting means for the missing color component of each pixel;
wherein the sensitivity correcting means includes estimating means for estimating an amount of sensitivity difference between a pixel of interest and a pixel with a same color component type as a color component type obtained at the pixel of interest in a predetermined neighborhood of the pixel of interest, and carries out sensitivity correction according to the amount of sensitivity difference.

18. The image processing apparatus according to claim 17, wherein the estimating means includes feature-value calculating means for calculating a predetermined feature value from a pixel value in the predetermined neighborhood of the pixel of interest, and estimates the amount of sensitivity difference based on the feature value.

19. The image processing apparatus according to claim 18, wherein the estimating means further includes a table where the feature value is associated with the amount of sensitivity difference and estimates the amount of sensitivity difference from the feature value by referring to the table.

20. The image processing apparatus according to claim 18, wherein the feature-value calculating means calculates the feature value from a pixel value of a pixel having a color component type different from the color component type obtained at the pixel of interest in the predetermined neighborhood.

21. The image processing apparatus according to claim 18, wherein the feature-value calculating means calculates N mean values of N combinations of pixels having the same color component type as the color component type obtained at the pixel of interest in the predetermined neighborhood, and sets the calculation results to the feature value, wherein N is an integer greater than or equal to one.

22. The image processing apparatus according to claim 21, wherein the sensitivity correcting means obtains differences Di between each of the N mean values and the pixel value of the pixel of interest, and, from among the N differences Di, sets Di which produces a minimum absolute value as the amount of sensitivity difference, wherein i is an integer from one to N.

23. The image processing apparatus according to claim 17, wherein the sensitivity correcting means carries out sensitivity correction by calculating an amount of correction of sensitivity difference from the amount of sensitivity difference based on a predetermined function and adding the calculated amount of correction of sensitivity difference to a pixel value of the pixel of interest.

24. The image processing apparatus according to claim 23, wherein the predetermined function is a function which outputs zero when an absolute value of the amount of sensitivity difference is at least a particular threshold.

25. The image processing apparatus according to claim 17, wherein the sensitivity correcting means includes:
coefficient setting means for setting a filter coefficient based on the amount of sensitivity difference; and
filter means for carrying out sensitivity correction by applying a linear filter using the filter coefficient to a pixel with the same color component type as the color component type obtained at the pixel of interest in the predetermined neighborhood.

26. A computer-readable medium storing an image processing program for causing a computer to process an image of pixels each missing at least one type of color component of each pixel, the image being produced by capturing an optical image with one of a single-chip image pickup system, a two-chip image pickup system, and a three-chip pixel-shifting image pickup system, the image processing program controlling the computer to perform functions comprising:
performing a sensitivity correcting operation which includes estimating an amount of sensitivity difference between a pixel of interest and a pixel with a same color component type as a color component type of the pixel of interest in a predetermined neighborhood of the pixel of interest, and correcting sensitivity of the image by calculating an amount of correction of sensitivity difference from the estimated amount of sensitivity difference based on a predetermined function and by adding the calculated amount of correction of sensitivity difference to a pixel value of the pixel of interest; and
performing an interpolating operation of compensating the image corrected in the sensitivity correcting operation for the missing color component of each pixel.

27. A computer-readable medium storing an image processing program for causing a computer to process an image of pixels each lacking at least one type of color component, the image being produced by capturing an optical image with one of a single-chip image pickup system, a two-chip image pickup system, and a three-chip pixel-shifting image pickup system, the image processing program controlling the computer to perform functions comprising:
performing a sensitivity correcting operation which includes estimating an amount of sensitivity difference between a pixel of interest and a pixel with a same color component type as a color component type of the pixel of interest in a predetermined neighborhood of the pixel of interest, setting a filter coefficient based on the amount of sensitivity difference, and carrying out sensitivity correction by applying a linear filter using the filter coefficient to a pixel with the same color component type as the color component type obtained at the pixel of interest in the predetermined neighborhood; and
performing an interpolating operation of compensating the image corrected in the sensitivity correcting operation for the missing color component of each pixel.

* * * * *